US012625317B2

(12) United States Patent
Okuyama et al.

(10) Patent No.: US 12,625,317 B2
(45) Date of Patent: May 12, 2026

(54) DISPLAY DEVICE

(71) Applicant: Japan Display Inc., Tokyo (JP)

(72) Inventors: Kentaro Okuyama, Tokyo (JP); Yuuji Oomori, Tokyo (JP); Makoto Miyao, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 18/899,142

(22) Filed: Sep. 27, 2024

(65) Prior Publication Data

US 2025/0110267 A1     Apr. 3, 2025

(30) Foreign Application Priority Data

Sep. 29, 2023     (JP) .................................. 2023-170051

(51) Int. Cl.
F21V 8/00 (2006.01)
G02F 1/1333 (2006.01)
G02F 1/1334 (2006.01)
G02F 1/13357 (2006.01)

(52) U.S. Cl.
CPC ......... G02B 6/0036 (2013.01); G02B 6/0091 (2013.01); G02F 1/133331 (2021.01); G02F 1/1334 (2013.01); G02F 1/133615 (2013.01)

(58) Field of Classification Search
CPC .... G02B 6/00123–0013; G02B 6/0015; G02B 6/0033–0063; G02F 1/133331; G02F 1/133615; G02F 1/133616
See application file for complete search history.

(56) References Cited

U.S. PATENT DOCUMENTS

2019/0302496 A1    10/2019    Okuyama
2020/0326581 A1*   10/2020    Miyao ............... G02F 1/133615
2022/0365398 A1    11/2022    Nakamura
2023/0359096 A1    11/2023    Nakamura et al.

FOREIGN PATENT DOCUMENTS

CN         201196687 Y  *  2/2009
JP        2019-174531 A     10/2019
JP         2020101684 A  *  7/2020
JP        2022-174556 A     11/2022
WO     WO-2017159556 A1 *  9/2017    .......... G02B 6/0038
WO        2022/158478 A1     7/2022

* cited by examiner

*Primary Examiner* — Jessica M Merlin
(74) *Attorney, Agent, or Firm* — XSENSUS LLP

(57) ABSTRACT

According to one embodiment, a display device includes a display panel, a transparent substrate, a fixing member, and a first light source unit. The transparent substrate has a first main face, a first incident face which is a first side face in contact with the first main face at a first edge, and a first non-incident face which is a second side face in contact with the first main face at a second edge. A shape of the first incident face and a shape of the first non-incident face are different from each other.

10 Claims, 19 Drawing Sheets

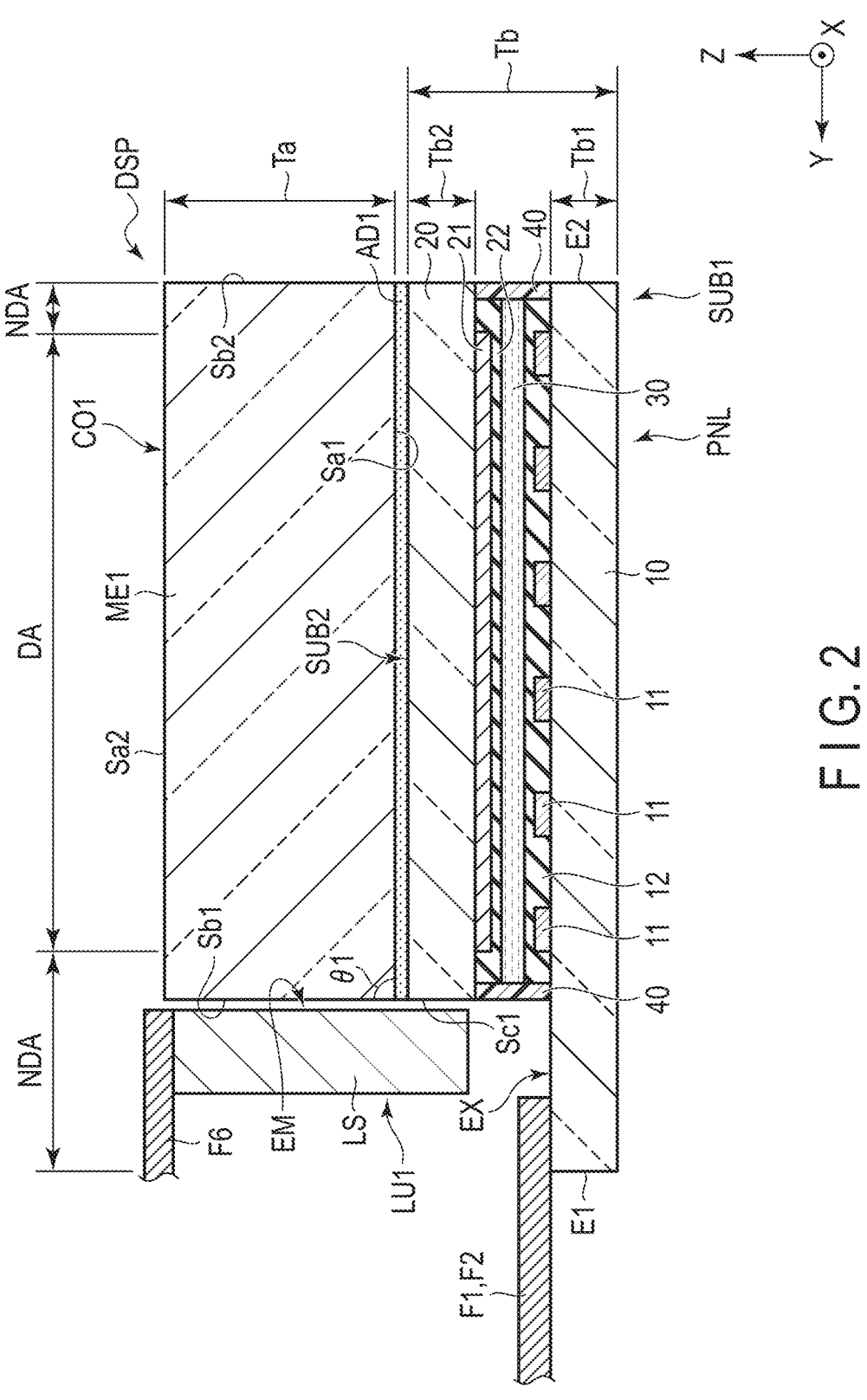
F I G. 2

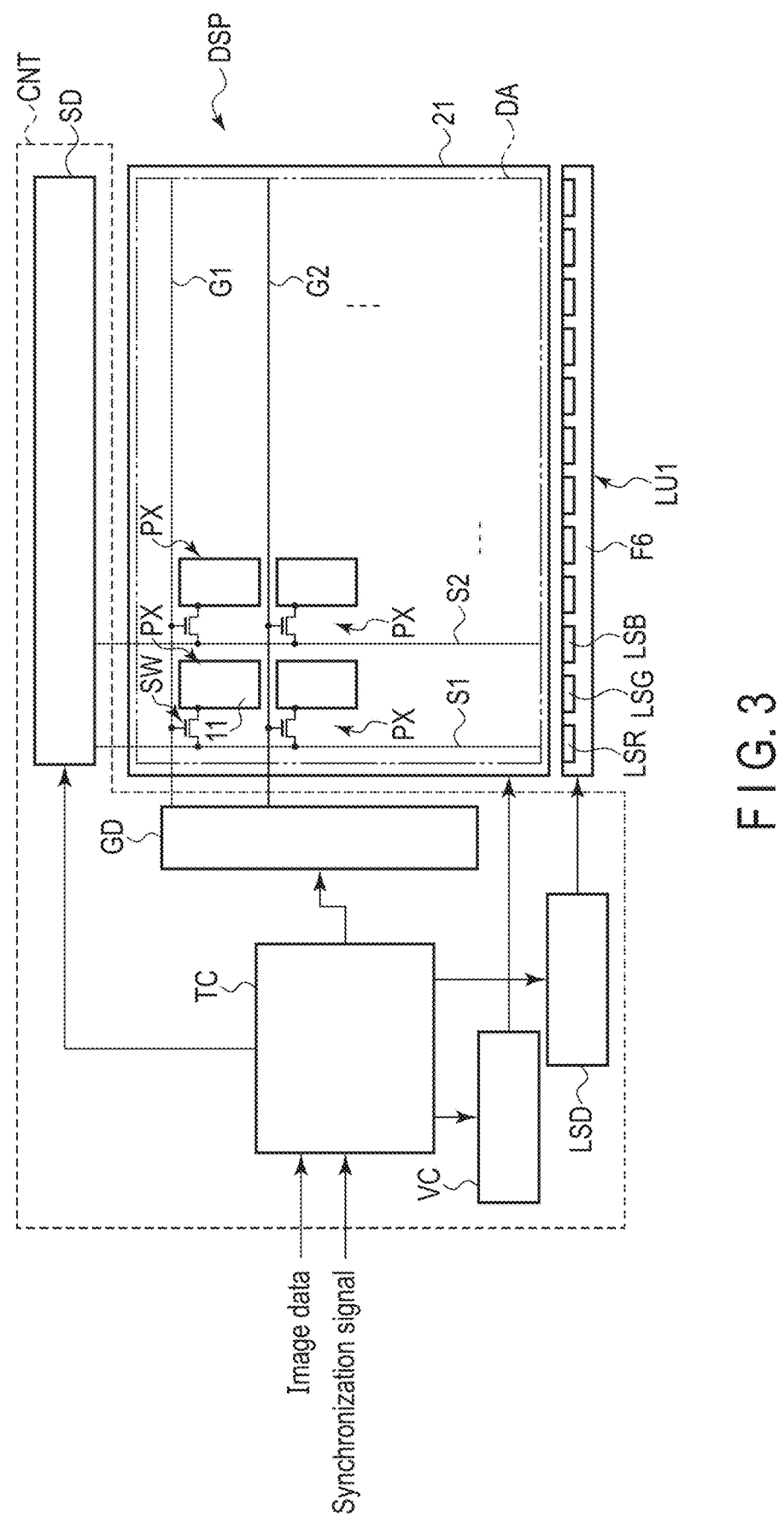
F I G. 3

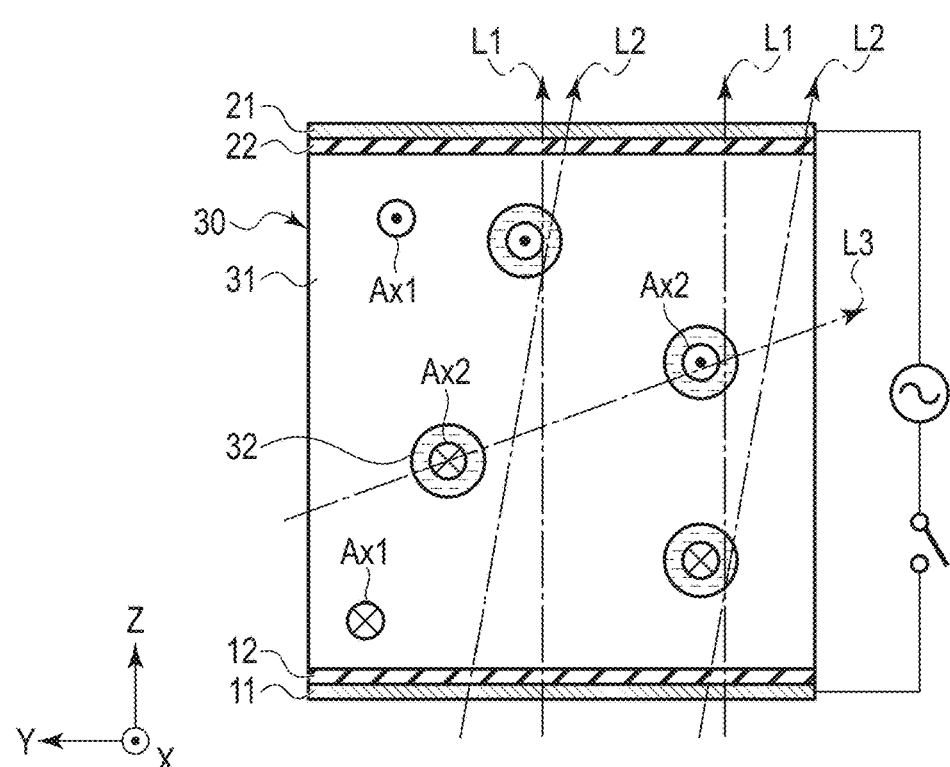
F I G. 4A
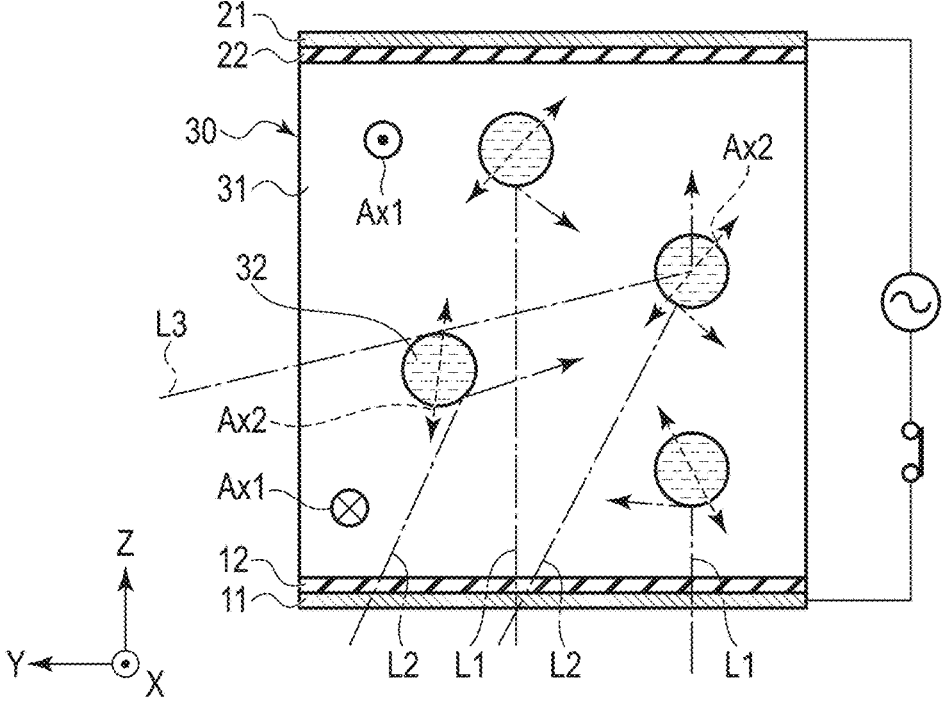
F I G. 4B

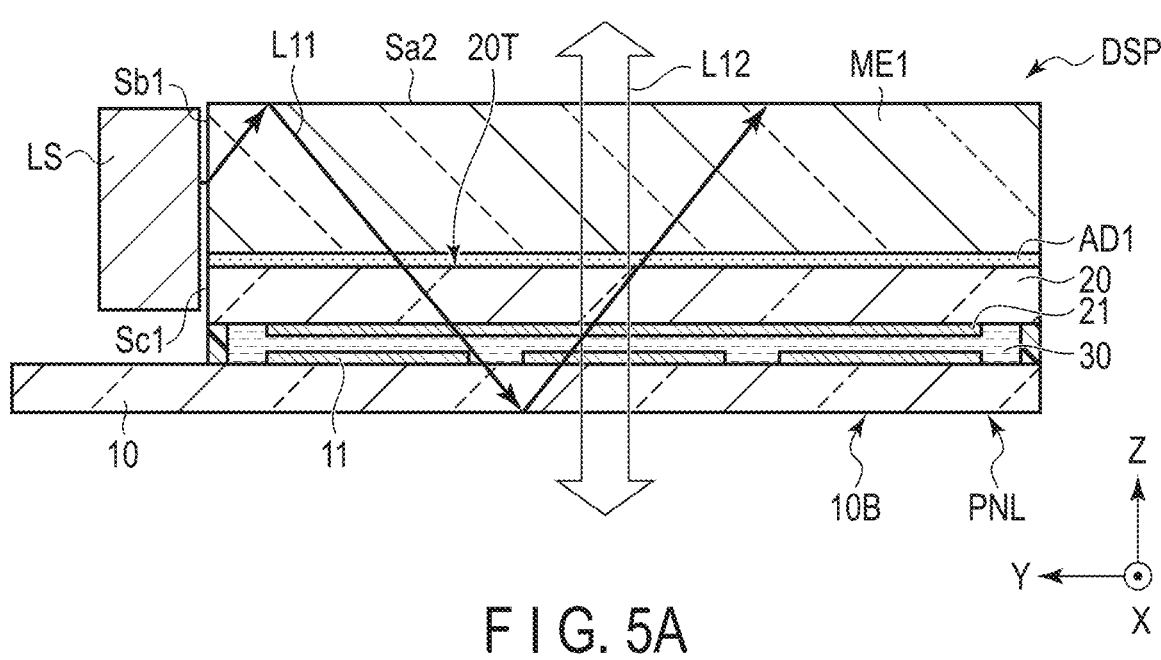
F I G. 5A
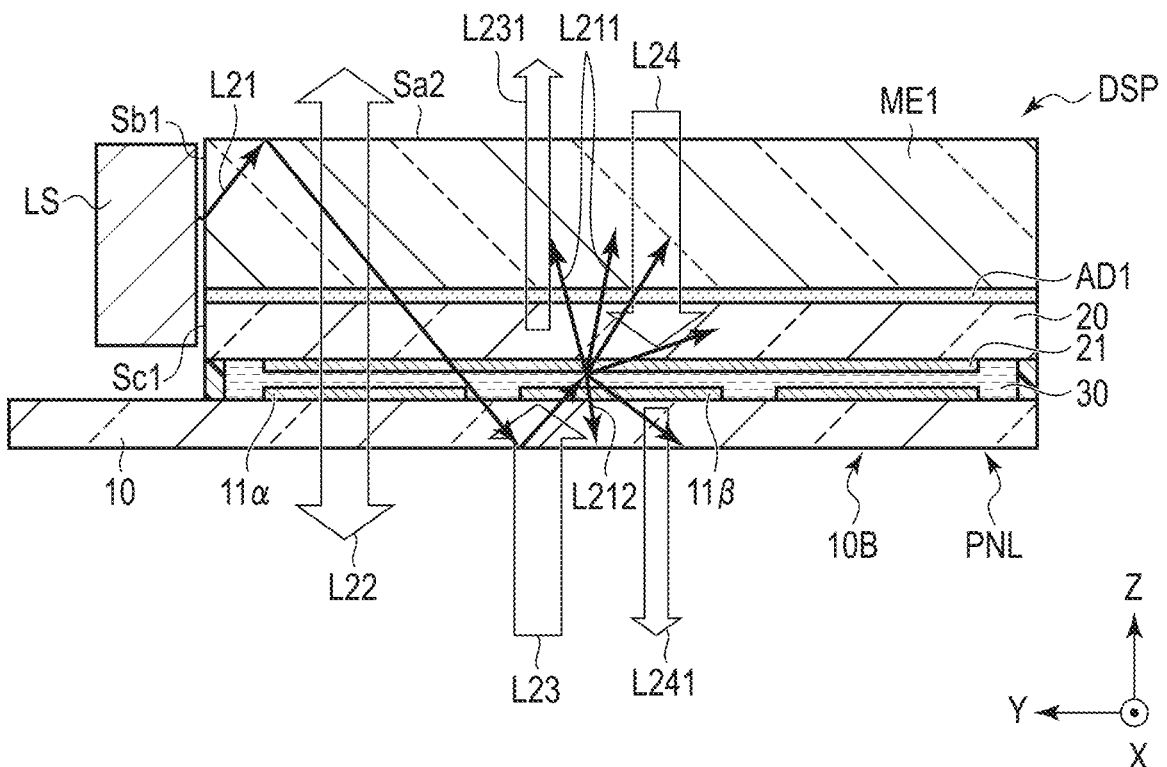
F I G. 5B

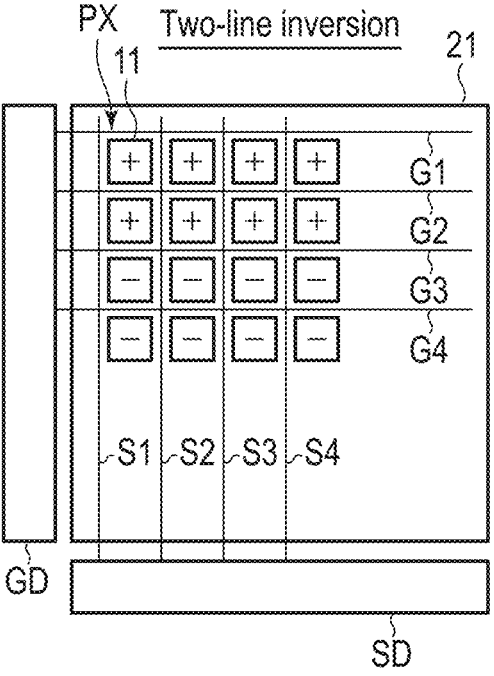
F I G. 7B
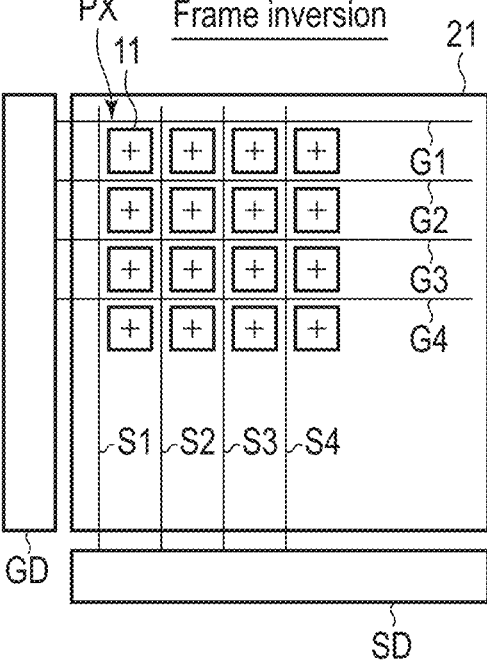
F I G. 7C

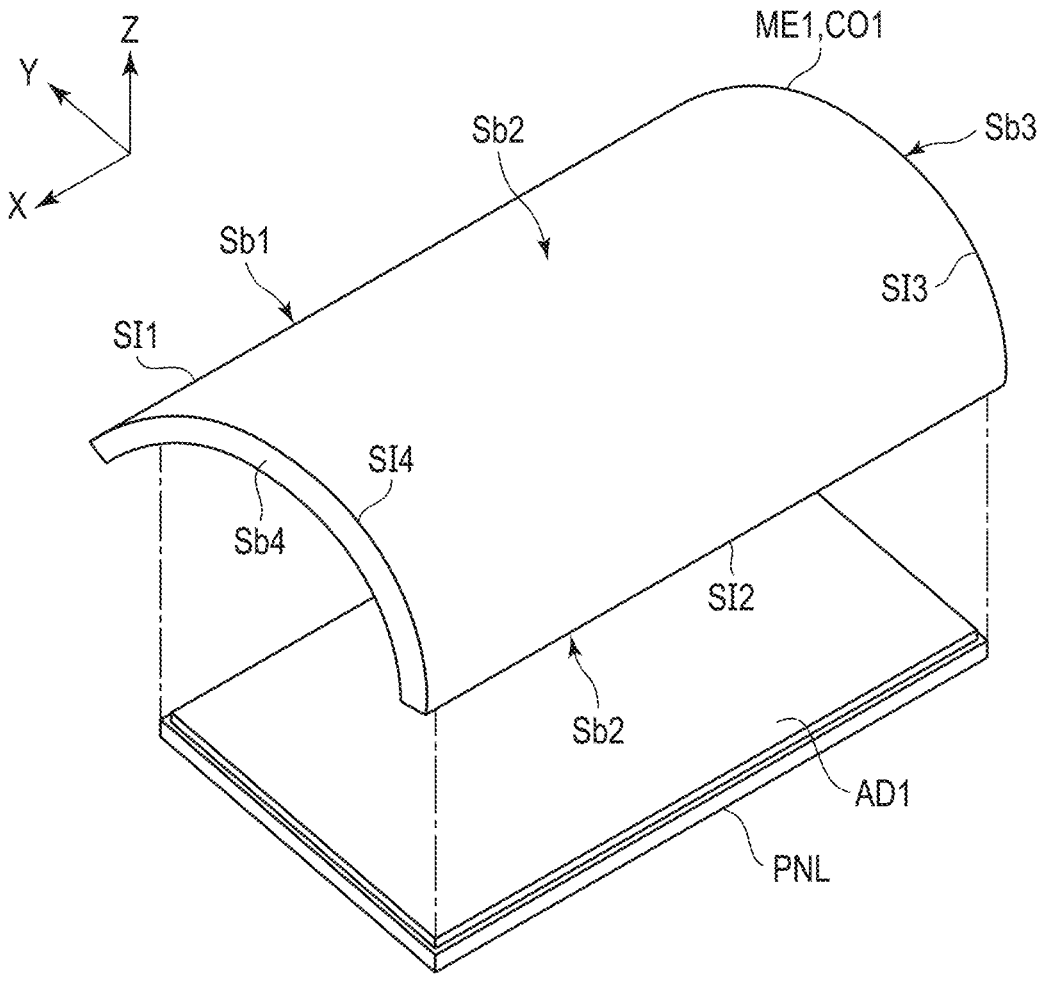
F I G. 12

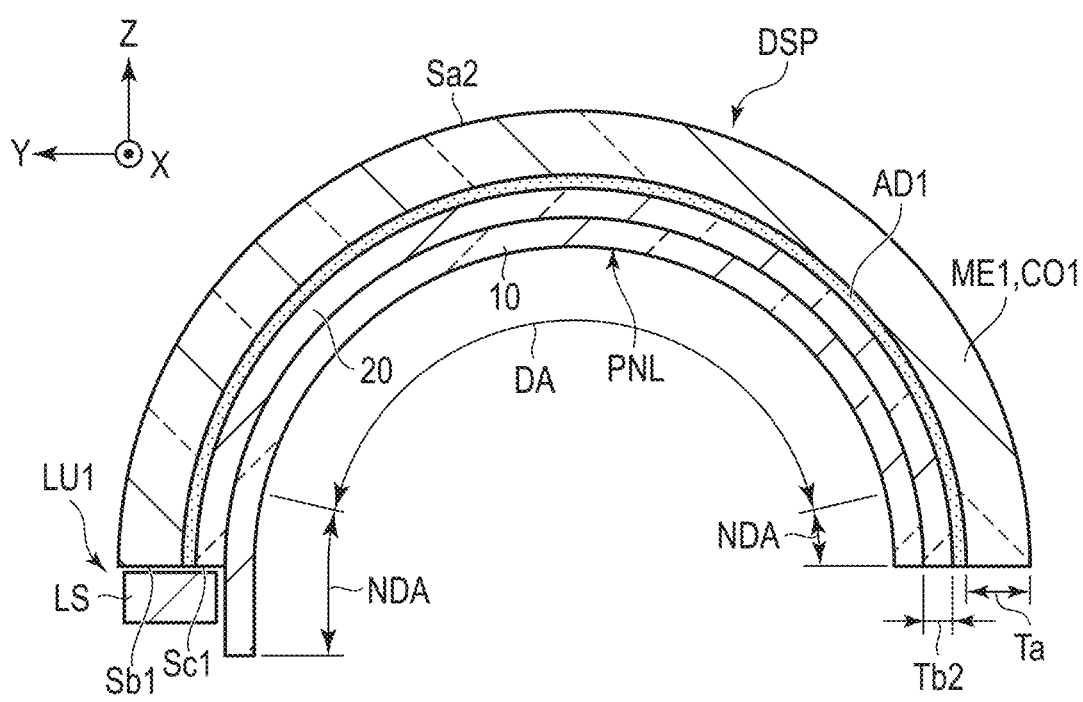
F I G. 13
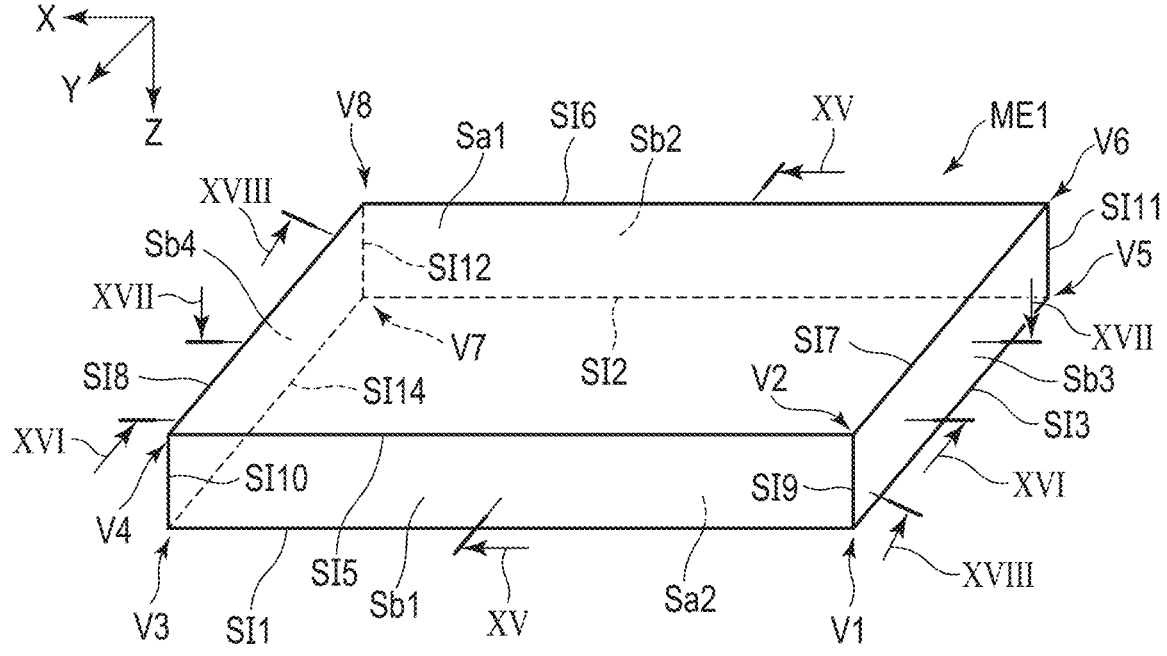
F I G. 14

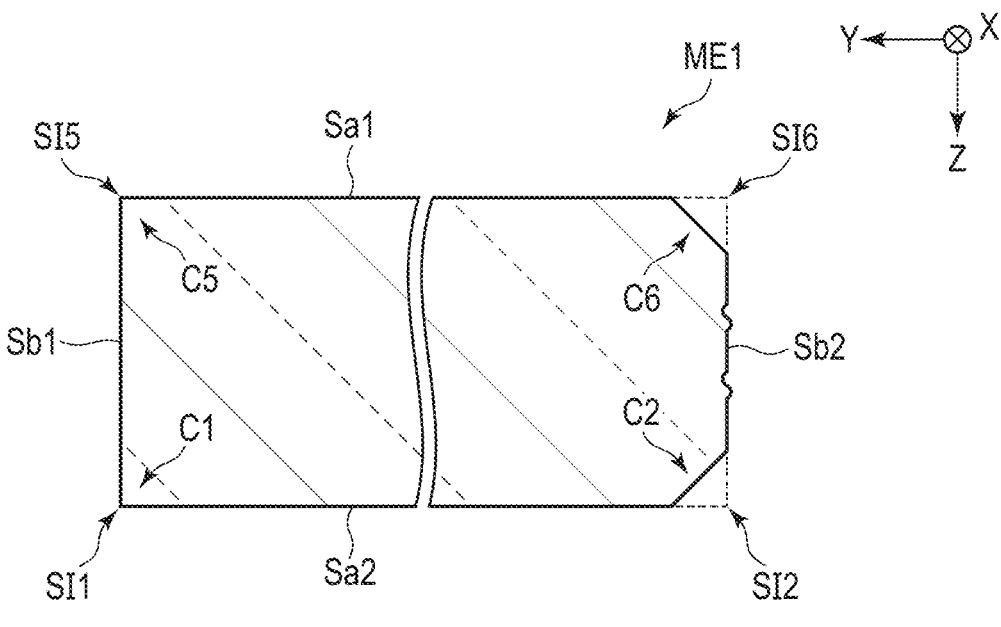
F I G. 15
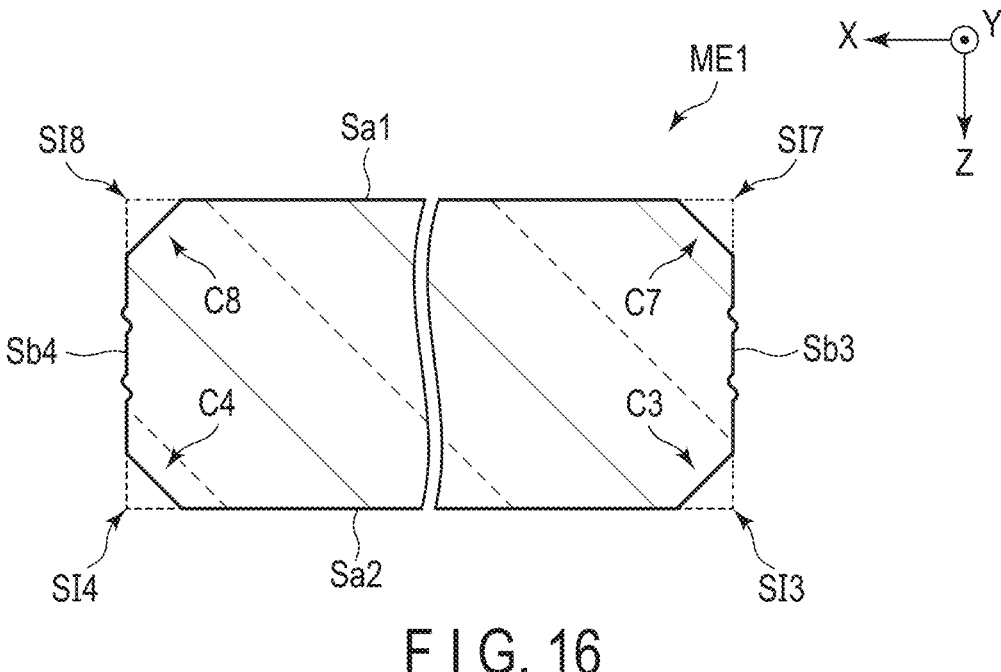
F I G. 16

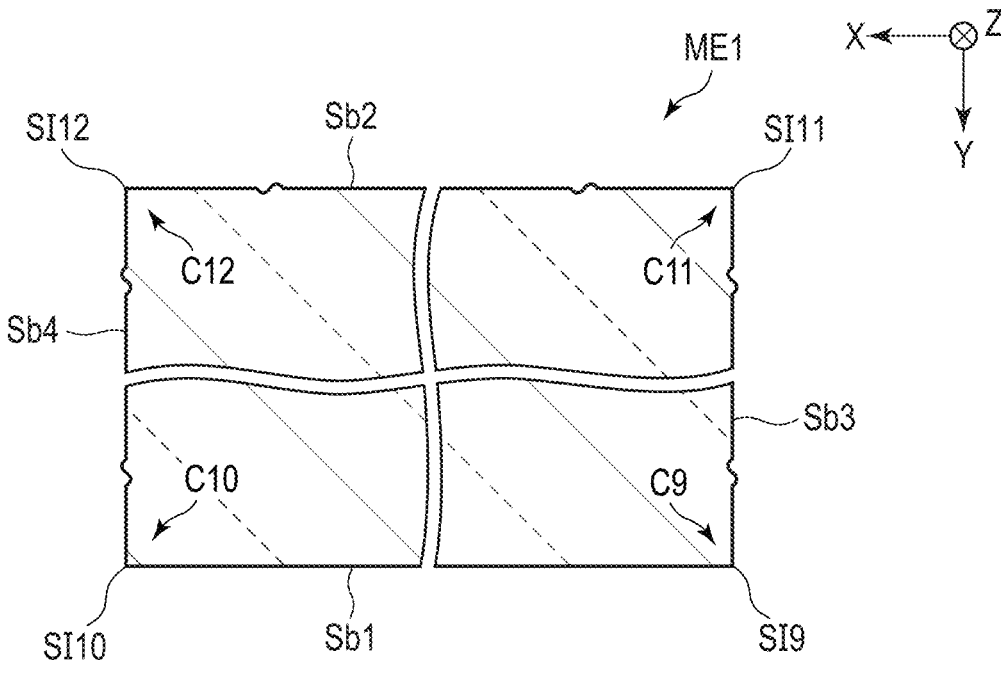
F I G. 17
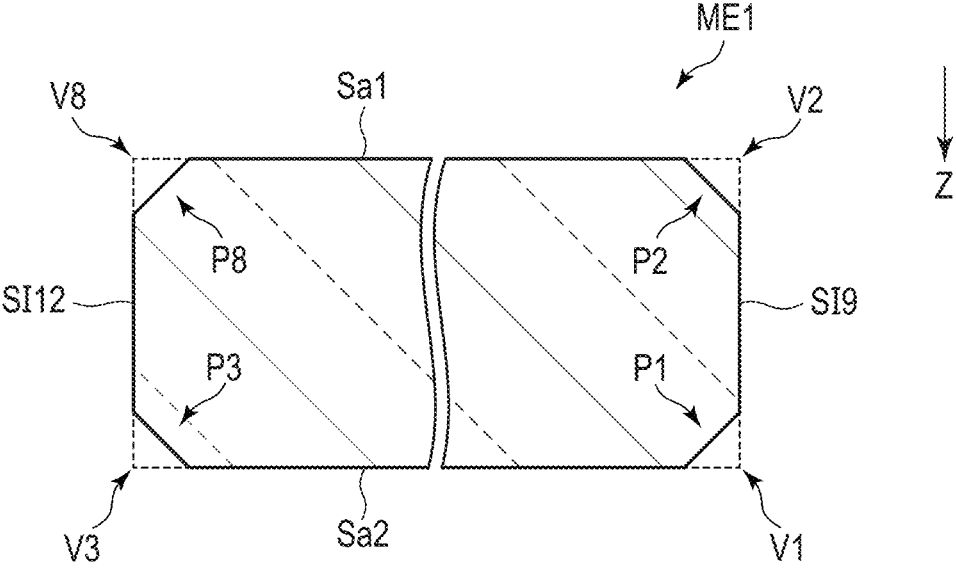
F I G. 18

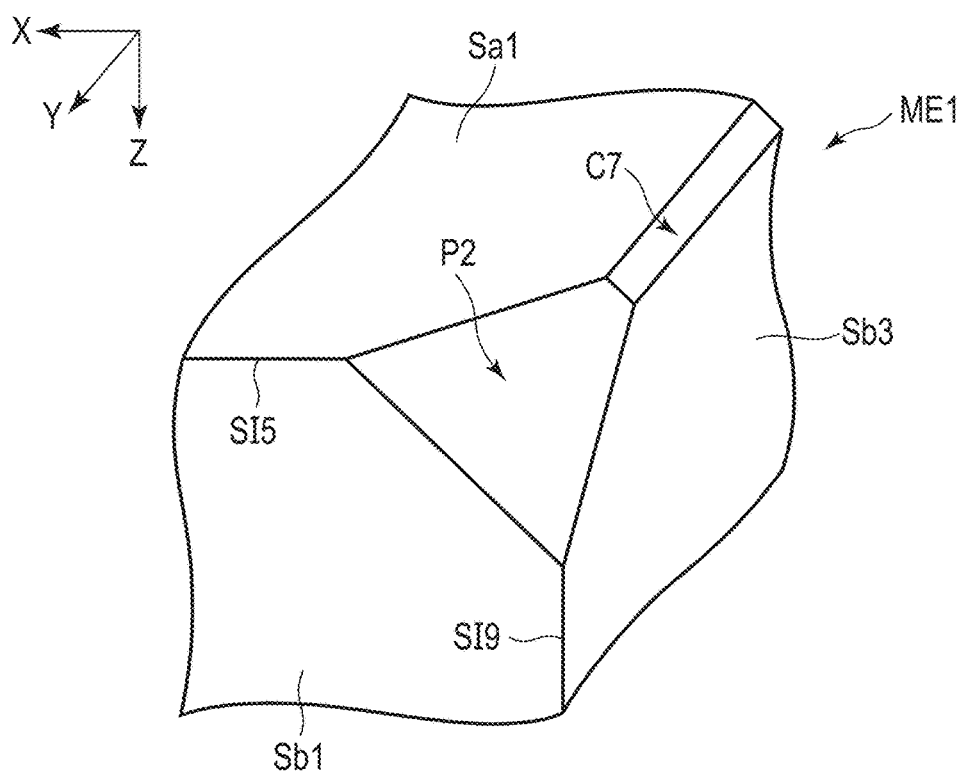
F I G. 19
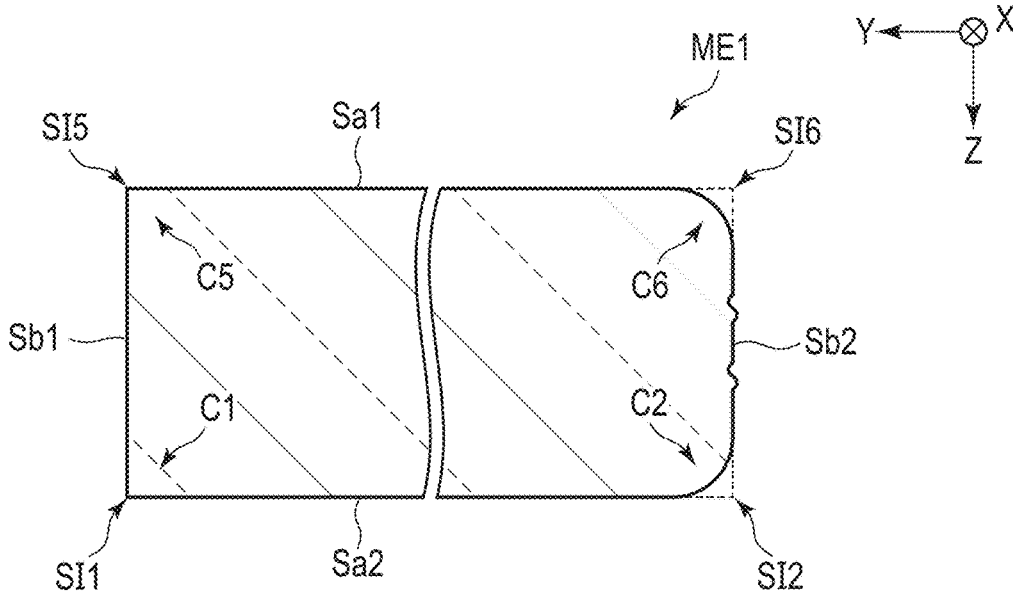
F I G. 20

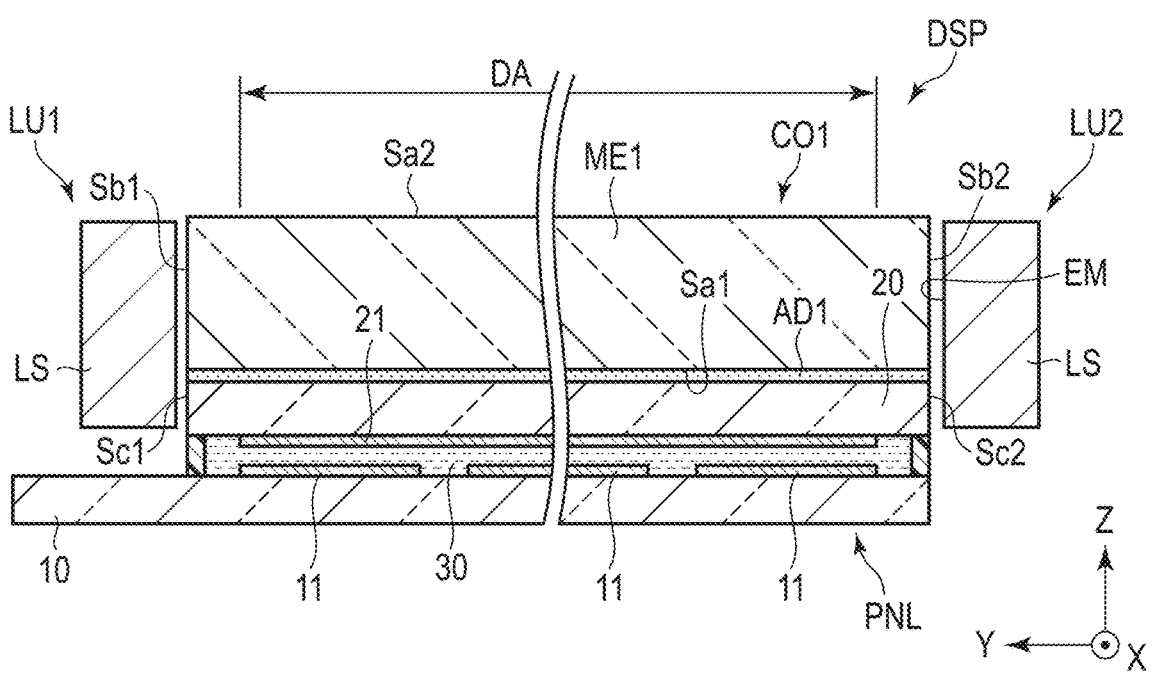
F I G. 21
F I G. 22

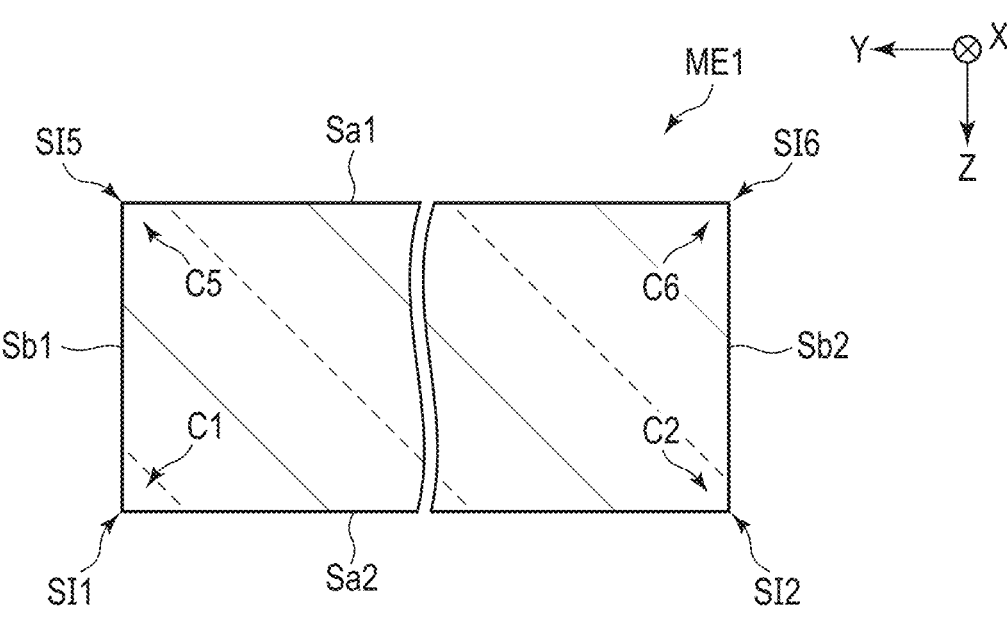
F I G. 23
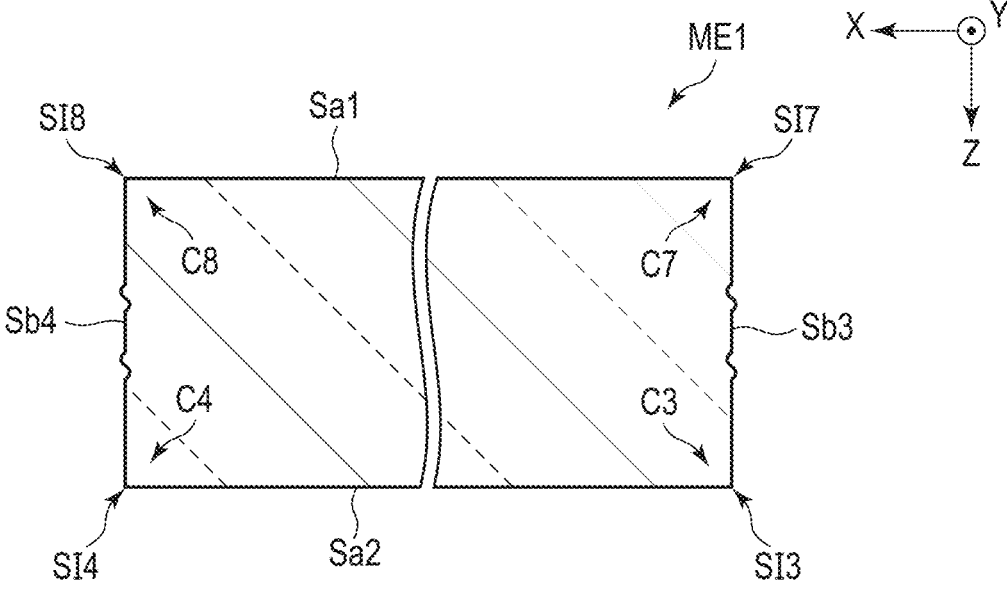
F I G. 24

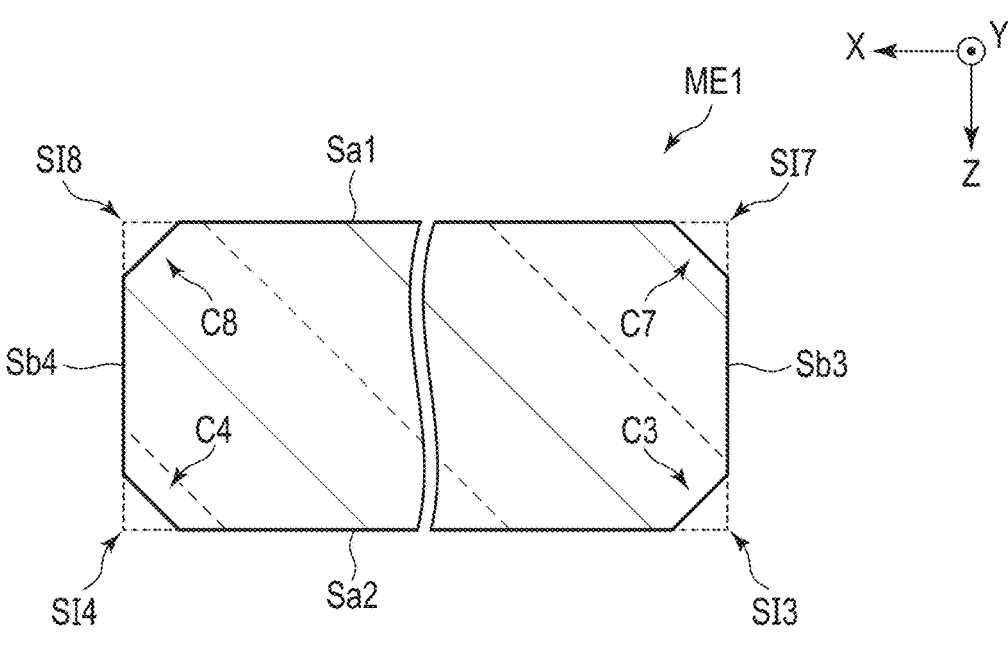
F I G. 25
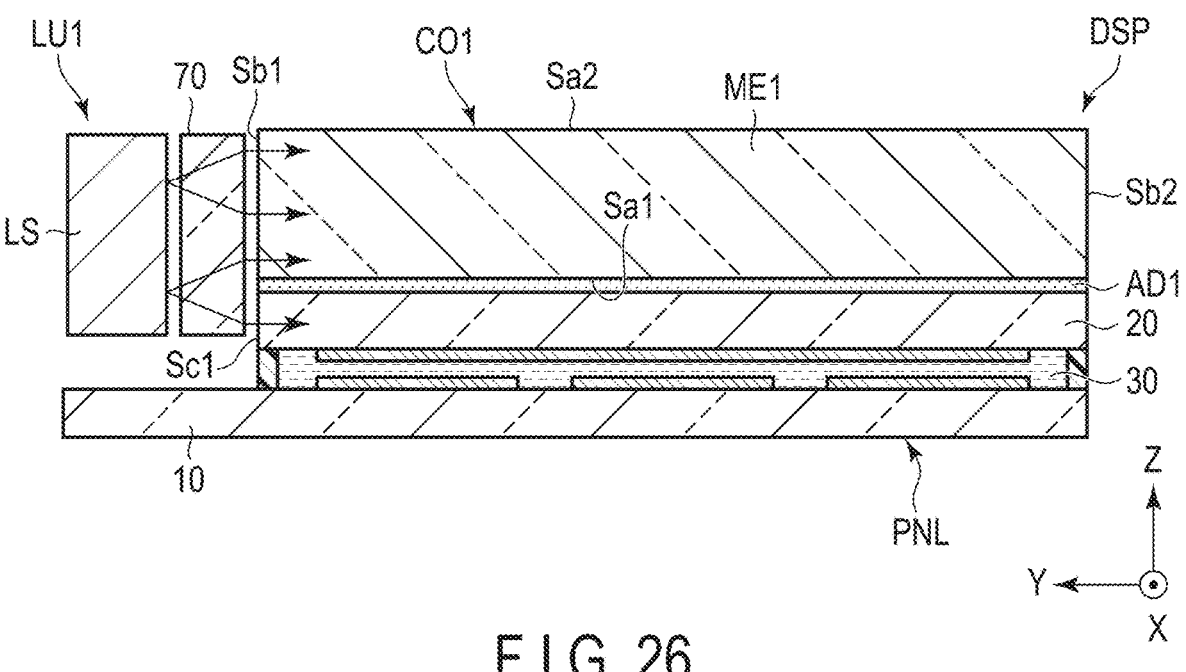
F I G. 26

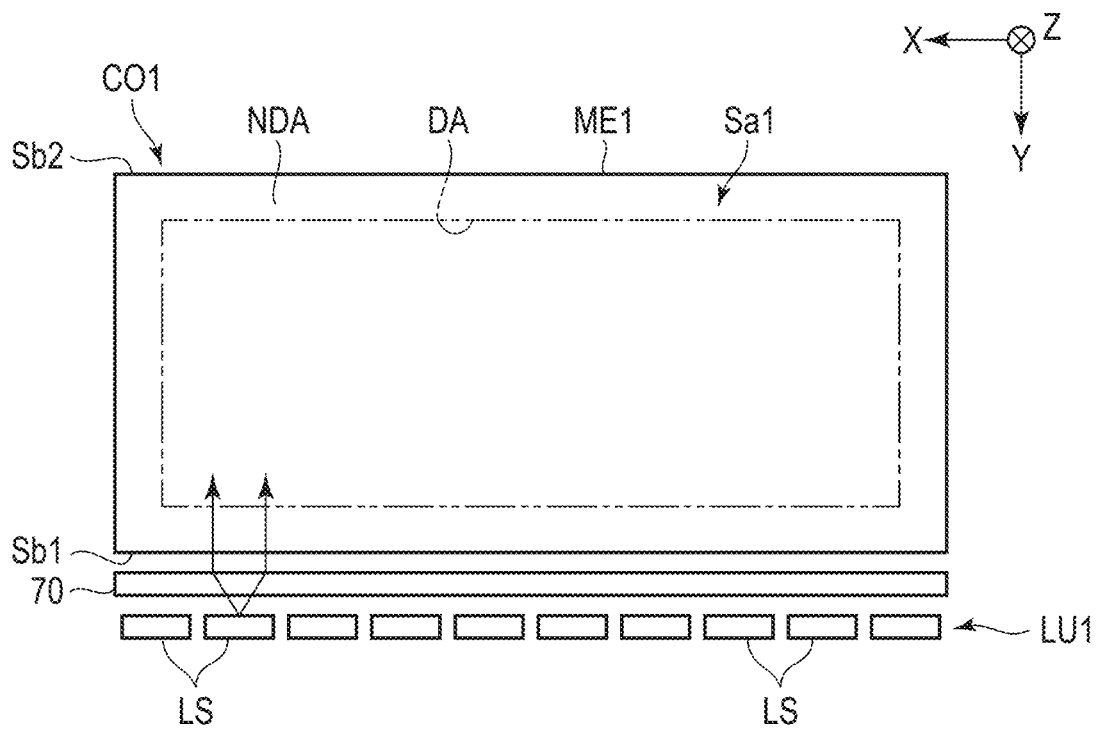
F I G. 27
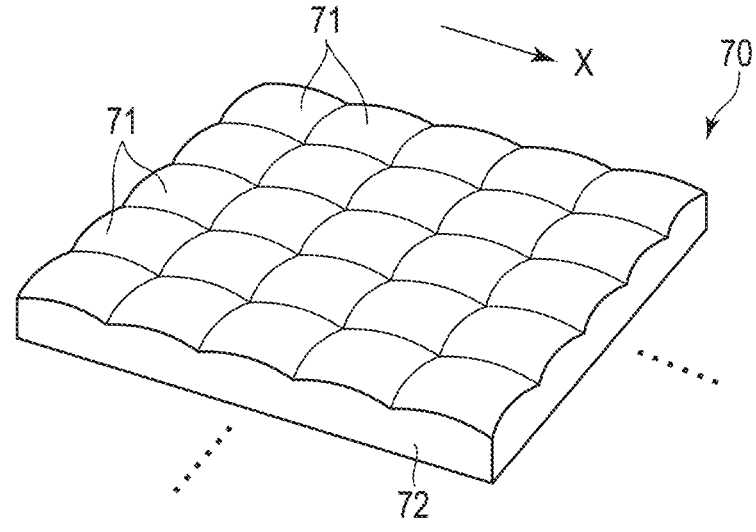
F I G. 28

DISPLAY DEVICE

CROSS-REFERENCE TO RELATED APPLICATIONS

This application is based upon and claims the benefit of priority from Japanese Patent Application No. 2023-170051, filed Sep. 29, 2023, the entire contents of which are incorporated herein by reference.

FIELD

Embodiments described herein relate generally to a display device.

BACKGROUND

Recently, display devices comprising a polymer dispersed liquid crystal (hereinafter referred to as "PDLC") panel capable of switching a diffusing state of diffusing incident light and a transmitting state of allowing the incident light to be transmitted, displaying an image, and allowing a background to be transmitted and the image to be visually recognized, have been proposed. In such a display device, one frame period includes sub-frame periods, and multi-color display is implemented by displaying the image while changing a display color in each of the sub-frame period.

BRIEF DESCRIPTION OF THE DRAWINGS

FIG. 2 is a developed cross-sectional view showing the display device shown in FIG. 1.

FIG. 3 is a diagram showing main constituent elements of the display device shown in FIG. 1.

FIG. 4A is a diagram showing a part of a display panel of the display device, schematically showing a liquid crystal layer in a transparent state.

FIG. 4B is a diagram showing a part of the display panel, schematically showing the liquid crystal layer in a scattered state.

FIG. 5A is a developed cross-sectional view showing the display panel in a case where when the liquid crystal layer is in a transparent state and a transparent substrate, together with a light emitting element.

FIG. 5B is a developed cross-sectional view showing the display panel in a case where when the liquid crystal layer is in a scattered state and the transparent substrate, together with a light emitting element.

FIG. 7B is a diagram showing an outline of two-line inversion drive.

FIG. 7C is a diagram showing an outline of frame-inversion drive.

FIG. 12 is an exploded perspective view showing the display panel and the cover panel of the display device, illustrating a state in which the display panel is to be adhered to the cover panel.

FIG. 13 is a cross-sectional view showing the display device.

FIG. 14 is a developed perspective view showing the transparent substrate of the first embodiment.

FIG. 15 is a cross-sectional view showing the transparent substrate in FIG. 14 along XV-XV line.

FIG. 16 is a cross-sectional view showing the transparent substrate in FIG. 14 along XVI-XVI line.

FIG. 17 is a cross-sectional view showing the transparent substrate in FIG. 14 along XVII-XVII line.

FIG. 18 is a cross-sectional view showing the transparent substrate in FIG. 14 along XVIII-XVIII line.

FIG. 19 is an enlarged perspective view showing a part of the transparent substrate in FIG. 14.

FIG. 20 is a cross-sectional view showing the transparent substrate of a modified example of the first embodiment.

FIG. 21 is a cross-sectional view showing a display device of a second embodiment.

FIG. 22 is a plan plan view showing a cover panel, first light source units, and second light source units of the second embodiment.

FIG. 23 is a cross-sectional view showing the transparent substrate of the second embodiment.

FIG. 24 is a cross-sectional view showing the transparent substrate of modified example 1 of the second embodiment.

FIG. 25 is a cross-sectional view showing the transparent substrate of modified example 2 of the second embodiment.

FIG. 26 is a cross-sectional view showing a display device of a third embodiment.

FIG. 27 is a plan plan view showing a cover panel, a first light source unit, and an optical member in the display device of the third embodiment.

FIG. 28 is a perspective view showing a part of the optical member of the third embodiment.

DETAILED DESCRIPTION

Figure 1:
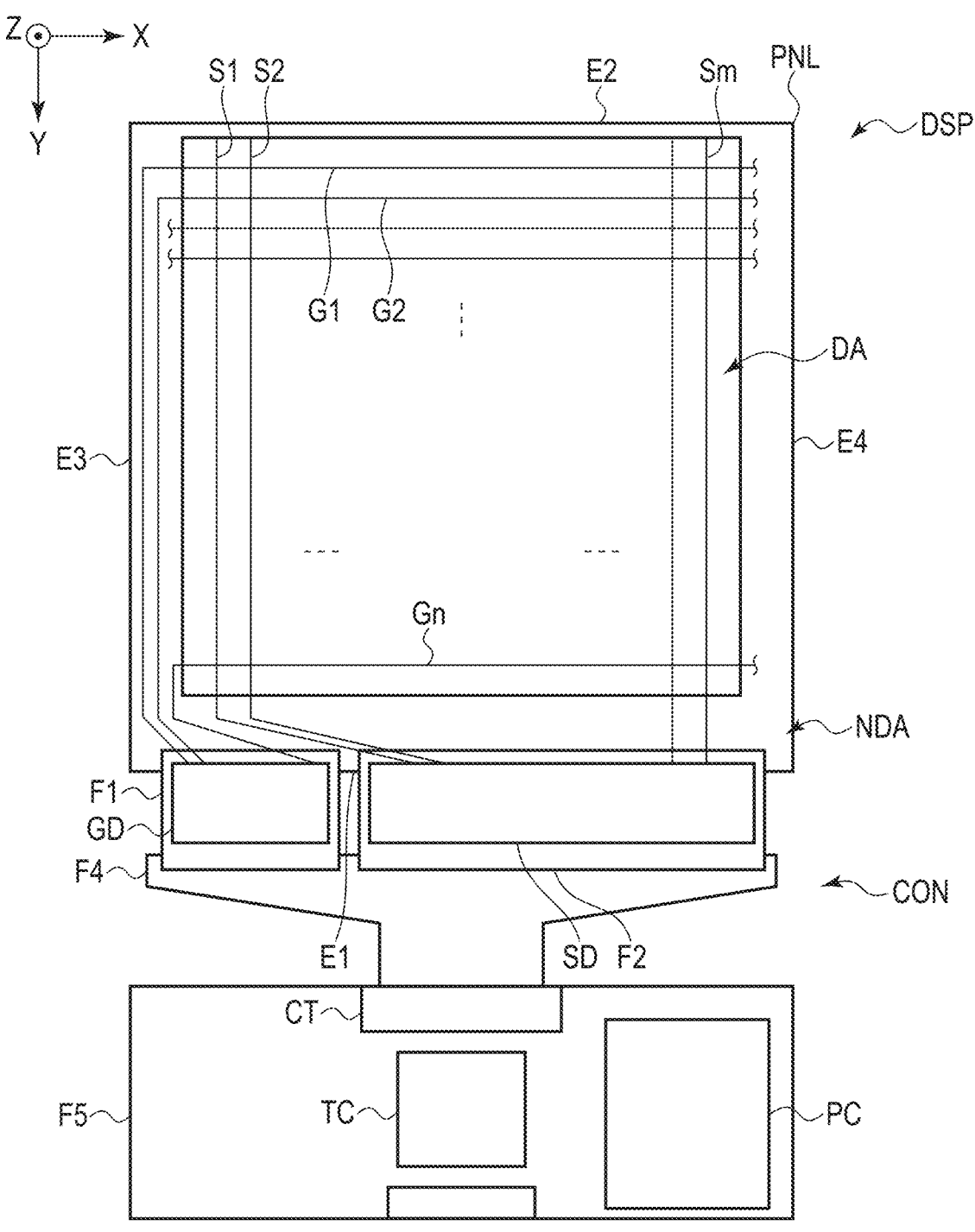
FIG. 1 is a plan view showing a configuration example of a display device of a first embodiment.

In general, according to one embodiment, there is provided a display device comprising: a display panel having a display area where an image is displayed and external light is transmitted; a transparent substrate overlapping with the display area, and having a first main face which has a first edge and a second edge, a first incident face which is a first side face in contact with the first main face at the first edge, and a first non-incident face which is a second side face in contact with the first main face at the second edge; a fixing member located between the transparent substrate and the display panel and fixing the display panel to the transparent substrate; and a first light source unit which is opposed to the first incident face of the transparent substrate and is configured to apply light to the first incident face.

A shape of the first incident face and a shape of the first non-incident face are different from each other.

According to another embodiment, there is provided a display device comprising: a display panel having a display area where an image is displayed and external light is transmitted; a transparent substrate overlapping with the display area, and having a first main face which has a first edge and a second edge, a first incident face which is a first side face in contact with the first main face at the first edge, and a first non-incident face which is a second side face in contact with the first main face at the second edge; a fixing member located between the transparent substrate and the display panel and fixing the display panel to the transparent substrate; and a first light source unit which is opposed to the first incident face of the transparent substrate and is configured to apply light to the first incident face.

The transparent substrate further has a first corner portion located at the first edge and a second corner portion located at the second edge.

The second corner portion has a chamfered shape.

The first corner portion is sharper than the second corner portion.

Embodiments will be described hereinafter with reference to the accompanying drawings. The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes and the like, of the respective parts are illustrated schematically in the drawings, rather than as an accurate representation of what is implemented, but such schematic illustration is merely exemplary, and in no way restricts the interpretation of the invention. In addition, in the specification and drawings, the same elements as those described in connection with preceding drawings are denoted by like reference numbers, and detailed description thereof is omitted unless necessary.

In each of the embodiments, a display device employing polymer dispersed liquid crystal will be described as an example of the display device.

First Embodiment

FIG. 1 is a plan view showing a configuration example of a display device DSP according to the present embodiment.

As shown in FIG. 1, a first direction X and a second direction Y are directions intersecting each other, and a third direction Z is a direction intersecting the first direction X and the second direction Y. The first direction X corresponds to the row direction while the second direction Y corresponds to the columnar direction. In one example, the first direction X, the second direction Y, and the third direction Z are orthogonal to one another but may intersect at an angle other than 90 degrees. In the present specification, a direction forwarding a tip of an arrow indicating the third direction Z is called an upward direction (or, more simply, upwardly) and a direction forwarding oppositely from the tip of the arrow is called a downward direction (or, more simply, downwardly).

The display device DSP comprises the display panel PNL, wiring boards F1, F2, F4, and F5, and the like. The display panel PNL includes the display area DA where images are displayed, and a frame-shaped non-display area NDA surrounding the display area DA. The display area DA includes n gate lines G (G1 to Gn), m source lines S (S1 to Sm), and the like. Incidentally, each of n and m is a positive integer, and n may be equal to or different from m. The plurality of gate lines G extend in the first direction X and are arranged to be spaced apart in the second direction Y. In other words, the plurality of gate lines G extend in the row direction. The plurality of source lines S extend in the second direction Y and are arranged to be spaced apart in the first direction X. The display panel PNL includes end portions E1 and E2 along the first direction X and end portions E3 and E4 along the second direction Y.

The wiring board F1 includes a gate driver GD. The plurality of gate lines G are connected to the gate driver GD. The wiring board F2 includes a source driver SD. The plurality of source lines S are connected to the source driver SD. Each of the wiring boards F1 and F2 is connected to the display panel PNL and the wiring board F4. The wiring board F5 includes a timing controller TC, a power supply circuit PC, and the like. The wiring board F4 is connected to a connector CT of the wiring board F5. Incidentally, the wiring boards F1 and F2 may be replaced with a single wiring board. Alternatively, the wiring boards F1, F2, and F4 may be replaced with a single wiring board. The gate driver GD, the source driver SD, and the timing controller TC described above constitute the control unit CON of the present embodiment, and the control unit CON is configured to control the drive of each of the plurality of gate lines G, the plurality of source lines S, a plurality of pixel electrodes to be described later, a common electrode to be described later, and the light source unit to be described later.

FIG. 2 is a developed cross-sectional view showing the display device DSP shown in FIG. 1. Several portions in the cross-section of the display device DSP on a Y-Z plane defined by the second direction Y and the third direction Z will be described here.

As shown in FIG. 2, the display device DSP comprises a cover panel CO1. The cover panel CO1 comprises a transparent substrate ME1. The transparent substrate ME1 is a cover glass and is formed of glass. The transparent substrate ME1 is a non-flexible substrate. The transparent substrate ME1 overlaps with at least the entire display area DA.

The transparent substrate ME1 has a main face Sa1, a main face Sa2, a side face Sb1, and a side face Sb2. The main face Sa2 is located on a side opposite to the main face Sa1. The main face Sa1 and the main face Sa2 overlap with the display area DA.

The side face Sb1 is located between the main face Sa1 and the main face Sa2. The side face Sb1 is a first light incident surface. The side face Sb2 is located between the main face Sa1 and the main face Sa2 and is located on a side opposite to the side face Sb1. In the present embodiment, the side face Sb1 and the side face Sb2 are located in the non-display area NDA. An angle between the main face Sa1 and the side face Sb1 is referred to as θ1. In the present embodiment, the angle θ1 is 90 degrees.

The display panel PNL has a display area DA where images are displayed and external light is transmitted. The display panel PNL is opposed to the main face Sa1 of the transparent substrate ME1. The display panel PNL has flexibility. The display panel PNL comprises a first substrate SUB1, a second substrate SUB2, a liquid crystal layer 30 serving as a display function layer, and the like. The first substrate SUB1 comprises a transparent first basement 10, a pixel electrode 11, an alignment film 12, and the like. The second substrate SUB2 comprises a transparent second basement 20, a common electrode 21, an alignment film 22, and the like. The second basement 20 is located between the first basement 10 and the transparent substrate ME1. The pixel electrodes 11 and the common electrode 21 are formed of, for example, a transparent conductive material such as indium tin oxide (ITO) or indium zinc oxide (IZO). The liquid crystal layer 30 is located in at least the display area DA.

The liquid crystal layer 30 is located between the first basement 10 (first substrate SUB1) and the second basement 20 (second substrate SUB2). More specifically, the liquid crystal layer 30 is located between the alignment films 12 and 22. The liquid crystal layer 30 contains polymer dispersed liquid crystal. The liquid crystal layer 30 of the present embodiment uses reverse mode polymer dispersed liquid crystal (R-PDLC). The above-described liquid crystal layer 30 maintains the parallelism of light made incident when the applied voltage is low or scatters the incident light when the applied voltage is high. The first substrate SUB1 and the second substrate SUB2 are bonded to each other by a sealing material 40. The first substrate SUB1 includes an extending portion EX that extends farther in the second direction Y than the side face Sc1 of the second basement 20.

An adhesive sheet AD1 is located between the transparent substrate ME1 and the display panel PNL and adheres the display panel PNL to the transparent substrate ME1. The adhesive sheet AD1 is in contact with and sticks to the transparent substrate ME1 on one side and is in contact with and sticks to the display panel PNL on the other side. The adhesive sheet AD1 overlaps with at least the entire display area DA. The adhesive sheet AD1 is formed of an optical clear adhesive (OCA) as a solid adhesive. However, the adhesive sheet AD1 may be formed of a material other than OCA, for example, optically clear resin (OCR). Furthermore, the display panel PNL and the transparent substrate ME1 may be adhered. In other words, the present embodiment includes a structure in which the display panel PNL and the transparent substrate ME1 are fixed. Therefore, the adhesive sheet AD1 is also referred to as a fixing member. In addition, no air layer is desirably located between the display panel PNL and the transparent substrate ME1.

The wiring boards F1 and F2 are connected to the extending portion EX of the first substrate SUB1.

A first light source unit LU1 is located in the non-display area NDA outside the display area DA. The first light source unit LU1 comprises a light emitting element LS, a wiring board F6, and the like. The light emitting element LS is connected to the wiring board F6 and located on the extending portion EX. The light emitting element LS includes a light emitting portion (light emitting surface) EM that is opposed to the side face Sb1 to emit light to the side face Sb1.

The illumination light emitted from the light emitting portion EM is made incident on the side face Sb1 and propagates through the transparent substrate ME1 (cover panel CO1), the adhesive sheet AD1, and the display panel PNL, as described below. In the present embodiment, the light emitting portion EM is also opposed to the side face Sc1 of the second basement 20. The illumination light emitted from the light emitting portion EM is also made incident on the side face Sc1.

Each of the first basement 10 and the second basement 20 is formed of glass. The first basement 10 has a thickness Tb1 and the second basement 20 has a thickness Tb2. Each of the thickness Tb1 and the thickness Tb2 is 0.2 mm or less. More specifically, each of the thickness Tb1 and the thickness Tb2 is 0.1 to 0.2 mm. In the present embodiment, each of the thickness Tb1 and the thickness Tb2 is 0.15 mm. The display panel PNL can be made flexible by forming the first basement 10 and the second basement 20 to be thin.

The transparent substrate ME1 has a thickness Ta and the display panel PNL has a thickness Tb, in the direction in which the transparent substrate ME1 and the display panel PNL are opposed. The thickness Tb includes the thickness Tb1, the thickness Tb2, the thickness of the liquid crystal layer 30, and the like. The thickness Ta of the transparent substrate ME1 is desirably larger than the thickness Tb of the display panel PNL. In the present embodiment, the thickness Ta of the transparent substrate ME1 is greater than the thickness Tb of the display panel PNL. The thickness Ta is 0.7 to 3.0 mm.

As described above, even if the thickness Tb2 of the second basement 20 is reduced, the transparent substrate ME1 has a thickness Ta greater than the thickness Tb2. The first light source unit LU1 can emit light to the side face Sb1 of the transparent substrate ME1. For this reason, the user can visually recognize the display images of the display device DSP desirably as compared to the case where the light source unit LU1 emits light to the side face Sc1 of the second basement 20. For example, the contrast ratio of the display device DSP can be increased.

In the present embodiment, the first light source unit LU1 emits light not only to the side face Sb1 but also to the side face Sc1. Therefore, the user can visually recognize the display images of the display device DSP further desirably.

Incidentally, the transparent substrate ME1 and the display panel PNL of the present embodiment are curved. However, the transparent substrate ME1 and the display panel PNL may not be curved. In this case, the main face Sa1 and the like may be parallel to the X-Y plane as shown in FIG. 2.

FIG. 3 is a diagram showing main constituent elements of the display device DSP shown in FIG. 1.

As shown in FIG. 3, the display device DSP comprises a controller CNT represented by a broken line in the drawing. The controller CNT includes a timing controller TC, a gate driver GD, a source driver SD, a Vcom circuit VC, a light source driver LSD, and the like.

The timing controller TC generates various signals, based on image data, a synchronization signal, and the like input from the outside. In one example, the timing controller TC outputs video signals generated by executing predetermined signal processing, based on the image data, to the source driver SD. In addition, the timing controller TC outputs the control signal generated based on the synchronization signals to each of the gate driver GD, the source driver SD, the Vcom circuit VC, and the light source driver LSD. The timing controller TC will be described below in detail.

A plurality of pixels PX are provided in the display area DA represented by a two-dot chain line in the drawing. Each of the pixels PX comprises a switching element SW and the pixel electrode 11. The switching element SW is formed of, for example, a thin-film transistor. The switching element SW is electrically connected to the gate line G and the source line S. The plurality of pixel electrodes 11 are located in the display area DA and arrayed in a matrix. For this reason, for example, the plurality of pixel electrodes 11 are provided in a plurality of rows. The pixel electrode 11 is connected to the source line S via the switching element SW. The common electrode 21 is located in the display area DA. The common electrode 21 is opposed to the plurality of pixel electrodes 11. Unlike the present embodiment, the common electrode 21 may be divided for each of at least one pixel PX and connected to each common line, and a common voltage may be applied to the divided common electrodes.

A gate signal is supplied from the gate driver GD to each of the gate lines G. The video signal (image signal) is supplied from the source driver SD to each of the source lines S. A common voltage Vcom is supplied from the Vcom circuit VC to the common electrode 21. The video signal supplied to the source line S is applied to the pixel electrode 11 connected to the switching element SW in a period in which the switching element SW becomes a conductive state based on the gate signal supplied to the gate line G. In the following descriptions, supplying the video signal to the pixel electrode 11 to form a potential difference between the pixel electrode 11 and the common electrode 21 may be referred to as writing the video signal (or applying the voltage) to the pixel PX comprising the pixel electrode 11.

The first light source unit LU1 is configured to emit light to the liquid crystal layer 30. In the present embodiment, the first light source unit LU1 is configured to emit light of a color other than achromatic color to the liquid crystal layer 30. The first light source unit LU1 comprises light emitting elements LS of a plurality of colors. For example, the first light source unit LU1 comprises a light emitting element (first light emitting element) LSR which emits light of a first color to the liquid crystal layer 30, a light emitting element (second light emitting element) LSG which emits light of a second color to the liquid crystal layer 30, and a light emitting element (third light emitting element) LSB which emits light of a third color to the liquid crystal layer 30. It is needless to say that the first, second, and third colors are different from one another. In the present embodiment, the first color is red, the second color is green, and the third color is blue.

The light source driver LSD controls lighting periods of the light emitting elements LSR, LSG, and LSB. In a driving system in which a one-frame period includes a plurality of sub-frame periods, at least one of three light emitting elements LSR, LSG, and LSB is turned on in each of the sub-frames such that the color of the illumination light is changed in each sub-frame, which will be described below in detail.

A configuration example of the display device comprising the liquid crystal layer 30 which is a polymer dispersed liquid crystal layer will be described below.

FIG. 4A is a diagram showing a part of the display panel PNL, schematically illustrating the liquid crystal layer 30 in a transparent state.

As shown in FIG. 4A, the liquid crystal layer 30 contains a liquid crystalline polymer 31 that is a streaky polymer, and liquid crystalline molecules 32. The liquid crystalline polymer 31 can be obtained by, for example, polymerizing liquid crystalline monomer in a state of being aligned in a predetermined direction by the alignment restriction force of the alignment films 12 and 22. The liquid crystalline molecules 32 are dispersed in the liquid crystalline monomer, and are aligned in a predetermined direction depending on the alignment direction of the liquid crystalline monomer when the liquid crystalline monomer is polymerized. In the present embodiment, the alignment films 12 and 22 are horizontal alignment films that initially align the liquid crystalline monomer and the liquid crystalline molecules 32 along the X-Y plane defined by the first direction X and the second direction Y. The liquid crystalline molecules 32 are positive liquid crystalline molecules having positive dielectric anisotropy.

Unlike the present embodiment, however, the alignment films 12 and 22 may be vertical alignment films that initially align the liquid crystalline monomer and the liquid crystalline molecules 32 along the third direction Z. Alternatively, the liquid crystalline molecules 32 may be negative liquid crystalline molecules having negative dielectric anisotropy.

The liquid crystalline polymer 31 and the liquid crystalline molecules 32 have equivalent optical anisotropy. Alternatively, the liquid crystalline polymer 31 and the liquid crystalline molecules 32 have substantially equal refractive anisotropy. In other words, an ordinary refractive index and an extraordinary refractive index of each of the liquid crystalline polymer 31 and the liquid crystalline molecules 32 are substantially equal to each other. Incidentally, for both the ordinary refractive index and the extraordinary refractive index, values of the liquid crystalline polymer 31 and the liquid crystalline molecules 32 may not completely match each other, and a deviation caused by an error in manufacturing or the like is allowed. In addition, the liquid crystalline polymer 31 and the liquid crystalline molecules 32 are different in responsiveness to the electric field. In other words, the responsiveness of the liquid crystalline polymer 31 to the electric field is lower than the responsiveness of the liquid crystalline molecules 32 to the electric field.

The example illustrated in FIG. 4A corresponds to a state in which no voltage is applied to the liquid crystal layer 30 (for example, a state in which a potential difference between the pixel electrode 11 and the common electrode 21 is zero) or a state in which a second transparent voltage to be described below is applied to the liquid crystal layer 30.

As shown in FIG. 4A, an optical axis Ax1 of the liquid crystalline polymer 31 and an optical axis Ax2 of the liquid crystalline molecules 32 are parallel to each other. In the example illustrated, each of the optical axis Ax1 and the optical axis Ax2 is parallel to the first direction X. The optical axis corresponds to a line parallel to a direction of travel of the light beam in which the refractive indexes indicate one value irrespective of the direction of polarization.

As described above, since the liquid crystalline polymer 31 and the liquid crystalline molecules 32 have the approximately equal refractive anisotropy and the optical axes Ax1 and Ax2 are parallel to each other, there is almost no refractive index difference between the liquid crystalline polymer 31 and the liquid crystalline molecules 32 in all directions including the first direction X, the second direction Y, and the third direction Z. For this reason, light beams L1 made incident on the liquid crystal layer 30 in the third direction Z are not substantially scattered in the liquid crystal layer 30 but are transmitted. The liquid crystal layer 30 can maintain the parallelism of the light beams L1. Similarly, light beam L2 and light beam L3 made incident in an oblique direction angled with respect to the third direction Z are hardly scattered in the liquid crystal layer 30. For this reason, high transparency can be obtained. The state illustrated in FIG. 4A is referred to as a transparent state.

FIG. 4B is a diagram showing a part of the display panel PNL, schematically showing the liquid crystal layer 30 in a scattered state.

As shown in FIG. 4B, as described above, the responsiveness of the liquid crystalline polymer 31 to the electric field is lower than the responsiveness of the liquid crystalline molecule 32 to the electric field. For this reason, in a state in which a voltage (scattering voltage to be described later) higher than each of the second transparent voltage and a transparent voltage to be described below is applied to the liquid crystal layer 30, the alignment direction of the liquid crystalline molecules 32 is changed in accordance with the electric field while the alignment direction of the liquid crystalline polymer 31 is hardly changed. In other words, as illustrated in the drawing, the optical axis Ax1 is substantially parallel to the first direction X while the optical axis Ax2 is oblique to the first direction X. For this reason, the optical axes Ax1 and the optical axes Ax2 intersect each other. Therefore, a large refractive index difference is made between the liquid crystalline polymer 31 and the liquid crystalline molecules 32 in all the directions including the first direction X, the second direction Y, and the third direction Z. The light beams L1 to L3 made incident on the liquid crystal layer 30 are therefore scattered in the liquid crystal layer 30. The state shown in FIG. 4B is referred to as a scattered state.

The control unit CON switches the state of the liquid crystal layer 30 to at least one of the transparent state and the scattered state.

FIG. 5A is a developed cross-sectional view showing the display panel PNL in a case where when the liquid crystal layer 30 is in a transparent state and the transparent substrate ME1, together with the light emitting element LS. As shown in FIG. 5A, the first basement 10 has a lower face 10B and the second basement 20 has an upper face 20T. Illumination light emitted from the light emitting element LS is made incident on the cover panel CO1 and the display panel PNL from the side face Sb1 of the transparent substrate ME1 and the side face Sc1 of the second basement 20.

For example, illumination light L11 emitted from the light emitting element LS and made incident on the side face Sb1 of the transparent substrate ME1 propagates through the transparent substrate ME1, the adhesive sheet AD1, the second basement 20, the liquid crystal layer 30, the first basement 10, and the like. When the liquid crystal layer 30 is in a transparent state, the illumination light L11 is hardly scattered in the liquid crystal layer 30 and therefore rarely leaks out from the lower face 10B of the first basement 10 and the main face Sa2 of the transparent substrate ME1.

An external light beam L12 made incident on the display panel PNL is hardly scattered in the liquid crystal layer 30 and is transmitted. In other words, the external light made incident on the display panel PNL from the lower face 10B is transmitted to the main face Sa2 of the transparent substrate ME1, and the external light made incident from the main face Sa2 is transmitted to the lower face 10B. For this reason, when the display device DSP is observed from the main face Sa2 side, the user can visually recognize a background on the lower face 10B side through the display panel PNL. Similarly, when the display device DSP is observed from the lower face 10B side, the user can visually recognize a background on the main face Sa2 side through the display panel PNL.

FIG. 5B is a developed cross-sectional view showing the display panel PNL in a case where when the liquid crystal layer 30 is in a scattered state and the transparent substrate ME1, together with the light emitting element LS. As shown in FIG. 5B, the illumination light emitted from the light emitting element LS is made incident on the cover panel CO1 and the display panel PNL from the side face Sb1 of the transparent substrate ME1 and the side face Sc1 of the second basement 20.

For example, illumination light L21 emitted from the light emitting element LS and made incident on the side face Sb1 of the transparent substrate ME1 propagates through the transparent substrate ME1, the adhesive sheet AD1, the second basement 20, the liquid crystal layer 30, the first basement 10, and the like. In the example illustrated, since the liquid crystal layer 30 between a pixel electrode 11α and the common electrode 21 (i.e., a liquid crystal layer to which a voltage applied between the pixel electrode 11α and the common electrode 21 is applied) is in a transparent state, the illumination light beam L21 is hardly scattered in an area opposed to the pixel electrode 11α, in the liquid crystal layer 30.

In contrast, since the liquid crystal layer 30 between a pixel electrode 11β and the common electrode 21 (i.e., a liquid crystal layer to which a voltage applied between the pixel electrode 11β and the common electrode 21 is applied) is in the scattered state, the illumination light beam L21 is scattered in an area opposed to the pixel electrode 11β, in the liquid crystal layer 30. A scattered light beam L211 of the illumination light beam L21 is emitted to the outside from the main face Sa2, and a scattered light beam L212 is emitted to the outside from the lower face 10B.

At a position which overlaps with the pixel electrode 11α, an external light beam L22 made incident on the display panel PNL is hardly scattered in the liquid crystal layer 30 and is transmitted, similarly to the external light beam L12 shown in FIG. 5A. At a position which overlaps with the pixel electrode 11β, a light beam L231 of an external light beam L23 made incident from the lower face 10B is scattered in the liquid crystal layer 30 and then transmitted from the main face Sa2. In addition, a light beam L241 of an external light beam L24 made incident from the main face Sa2 is scattered in the liquid crystal layer 30 and then transmitted from the lower face 10B.

For this reason, when the display device DSP is observed from the main face Sa2 side, a color of the illumination light beam L21 can be visually recognized at a position which overlaps with the pixel electrode 11β. In addition, since the external light beam L231 is transmitted through the display panel PNL, the background on the lower face 10B side can also be visually recognized through the display panel PNL. Similarly, when the display device DSP is observed from the lower face 10B side, a color of the illumination light beam L21 can be visually recognized at a position which overlaps with the pixel electrode 11β. In addition, since the external light beam L241 is transmitted through the display panel PNL, the background on the main face Sa2 side can also be visually recognized through the display panel PNL. At a position which overlaps with the pixel electrode 11α, the color of the illumination light beam L21 can hardly be recognized visually and the background can be visually recognized through the display panel PNL since the liquid crystal layer 30 is in the transparent state.

Figure 6:
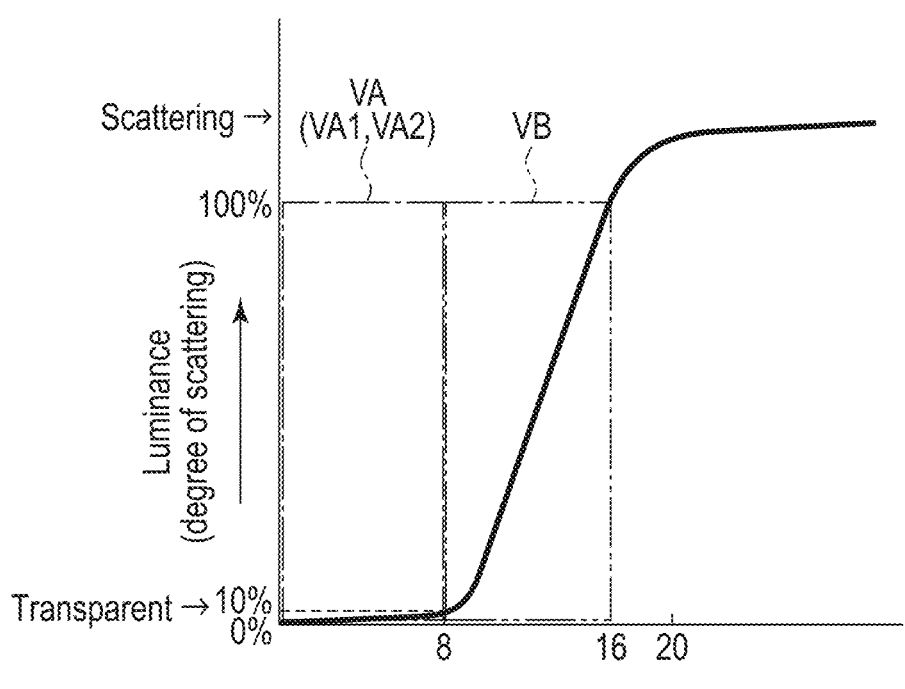
FIG. 6 is a graph showing scattering characteristic of the liquid crystal layer.

FIG. 6 is a graph showing the scattering characteristic of the liquid crystal layer 30, indicating a relationship between the luminance and a voltage VLC applied to the liquid crystal layer 30. The luminance corresponds to luminance of scattered light beam L211 obtained when the illumination light beam L21 emitted from the light emitting element LS is scattered in the liquid crystal layer 30 as shown in, for example, FIG. 5B. This luminance indicates a scattering degree of the liquid crystal layer 30 from the other viewpoint.

As shown in FIG. 6, when the voltage VLC is increased from 0V, the luminance is rapidly increased from approximately 8V and saturated at approximately 20V. Incidentally, the luminance is slightly increased if the voltage VLC is in a range from 0V to 8V. In the present embodiment, the voltage in an area surrounded by a two-dot chain line, i.e., a range from 8V to 16V is used for reproduction of gradation (for example, 256 gradation) of each pixel PX. The voltage in a range $8V < VLC \leq 16V$ is hereinafter referred to as a scattering voltage. In addition, in the present embodiment, the area surrounded by a one-dot chain line, i.e., the voltage in a range $0V \leq VLC \leq 8V$ is referred to as a transparent voltage. A transparent voltage VA includes the first transparent voltage VA1 and second transparent voltage VA2 described above. Incidentally, the lower limit and the upper limit of the scattering voltage VB and the transparent voltage VA are not limited to this example but can arbitrarily be determined in accordance with the scattering property of the liquid crystal layer 30.

The degree of scattering in a case where the scattering voltage VB is applied to the liquid crystal layer 30 and the degree of scattering of the light made incident on the liquid crystal layer 30 is the highest is assumed to be 100%. The degree of scattering in a case of applying the scattering voltage VB of 16V to the liquid crystal layer 30 is assumed to be 100%. For example, the transparent voltage VA can be defined as a voltage in a range of the voltage VLC with the degree of scattering (luminance) less than 10%. Alternatively, the transparent voltage VA can also be defined as the voltage VLC lower than or equal to a voltage (8V in the example of FIG. 6) corresponding to the lowest gradation.

In addition, the transparent voltage VA (first transparent voltage VA1 and second transparent voltage VA2) may be different from that in the example shown in FIG. 6. For example, the first transparent voltage VA1 may be a voltage with the degree of scattering in a range of 10% or more and 50% or less. In addition, the second transparent voltage VA2 may be a voltage with the degree of scattering in a range lower than 10%.

Incidentally, the graph shown in FIG. 6 is applicable to a case where the polarity of the voltage applied to the liquid crystal layer 30 is positive polarity (+) and negative polarity (−). In the latter case, the voltage VLC is an absolute value of the negative-polarity voltage.

Figure 7A:
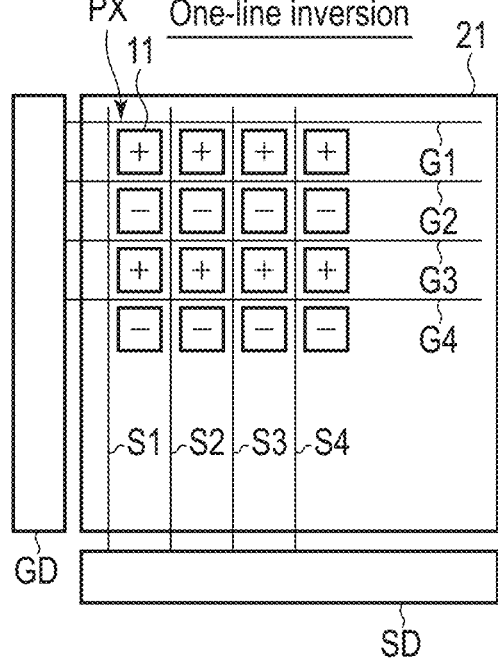
FIG. 7A is a diagram showing an outline of one-line inversion drive.

The polarity inversion drive scheme of inverting the polarity of the voltage applied to the liquid crystal layer 30 can be applied to the display device DSP. FIG. 7A, FIG. 7B, and FIG. 7C are diagrams showing an outline of the polarity inversion drive scheme.

FIG. 7A shows a one-line inversion drive scheme of inverting the positive polarity (+) and the negative polarity (−) of the voltage applied to the liquid crystal layer 30 (i.e., the voltage written to the pixel PX) in each group of pixels PX (one line) connected to one gate line G. In such a drive scheme, for example, the polarity of the common voltage supplied to the common electrode 21 and the polarity of the video signal supplied from the source driver SD to the source line S (i.e., polarity of a source line voltage) are inverted for each horizontal period in which the gate driver GD supplies the gate signal to the gate line G. In the same horizontal period, the polarity of the common voltage and the polarity of the video signal are, for example, opposite to each other.

FIG. 7B shows a two-line inversion drive scheme of inverting the positive polarity (+) and the negative polarity (−) of the voltage to be applied to the liquid crystal layer 30 in every two lines. The present invention is not limited to the example shown in FIG. 7A and FIG. 7B, but the polarity may be inverted in every three or more lines.

FIG. 7C shows a frame-inversion drive scheme of inverting the positive polarity (+) and the negative polarity (−) of the voltage applied to the liquid crystal layer 30 in each frame period for displaying an image corresponding to one piece of image data. In such a drive method, for example, the polarity of the common voltage and the polarity of the video signal are inverted in each frame period. In the same frame period, for example, the polarity of the common voltage and the polarity of the video signal are opposite to each other.

Figure 8:
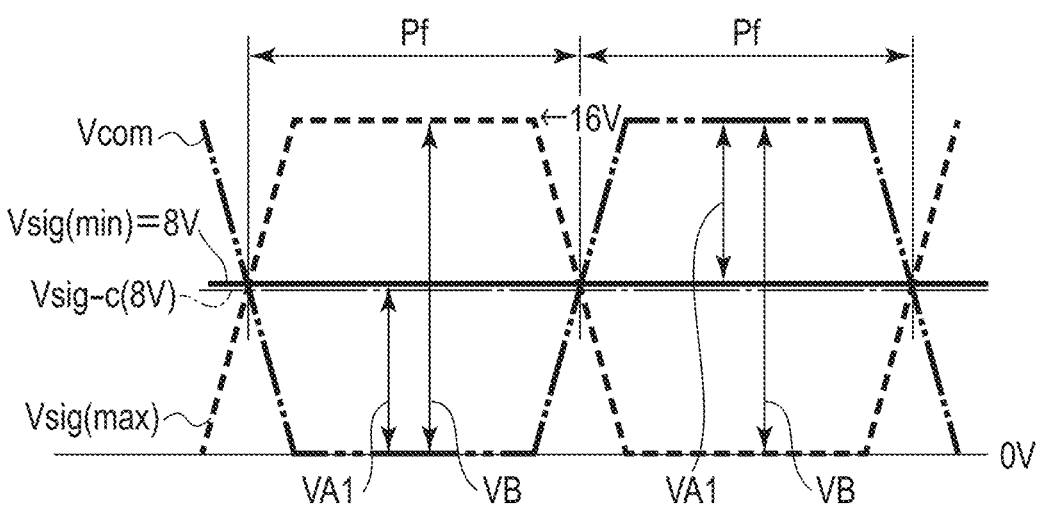
FIG. 8 is a chart showing an example of a common voltage and a source line voltage in a display drive.

FIG. 8 is a chart showing an example of the common voltage Vcom supplied to the common electrode 21 and the source line voltage Vsig supplied to the source line S (or the pixel electrode 11) in the display drive to which the one-line inversion drive scheme shown in FIG. 7A is applied.

As shown in FIG. 8, a waveform corresponding to a maximum value (max) of gradation and a waveform corresponding to a minimum value (min) of gradation are illustrated with respect to the source line voltage Vsig. The waveform of the source line voltage Vsig (min) is represented by a solid line, the waveform of the common voltage Vcom is represented by a two-dot chain line, and the waveform of the source line voltage Vsig (max) is represented by a broken line. In the example of this drawing, the polarities of the common voltage Vcom and the source line voltage Vsig (see the waveform of the maximum value) are inverted in each frame period Pf. A reference voltage Vsig-c is, for example, 8V. The lower limit is 0V and the upper limit is 16V in each of the common voltage Vcom and the source line voltage Vsig.

However, when the frame period Pf includes a plurality of sub-frame periods, the polarity of the common voltage Vcom and the polarity of the source line voltage Vsig may be inverted in each frame period Pf, or may be inverted in each field period.

The polarity inversion drive scheme including not only the example shown in FIG. 8, but the example of FIG. 9 to be described later will be focused. When the drive voltage to be applied to the liquid crystal layer 30 (voltage to be written to the pixel PX) has a positive polarity, a difference (Vsig−Vcom) between the source line voltage Vsig and the common voltage Vcom becomes 0V or a positive voltage value. In contrast, if the drive voltage to be applied to the liquid crystal layer 30 (voltage to be written to the pixel PX) has negative polarity, the difference (Vsig−Vcom) between the source line voltage Vsig and the common voltage Vcom is 0V or a negative voltage value.

The polarity inversion drive scheme shown in FIG. 8 will be focused. In a period in which the positive-polarity voltage is written to the pixel PX, the common voltage Vcom becomes 0V, and the source line voltage Vsig becomes a voltage value corresponding to gradation indicated by image data in a range of 8V or more and 16V or less. In contrast, in a period in which the negative-polarity voltage is written to the pixel PX, the common voltage Vcom becomes 16V, and the source line voltage Vsig becomes a voltage value corresponding to gradation indicated by image data in a range of 0V or more and 8V or less. In other words, in either of the cases, the voltage of 8V or more and 16V or less is applied between the common electrode 21 and the pixel electrode 11.

As shown in FIG. 6, even when the voltage VLC applied to the liquid crystal layer 30 is 8V, i.e., the first transparent voltage VA1 is applied to the liquid crystal layer 30, the liquid crystal layer 30 has the degree of scattering of approximately 0 to 10%. Therefore, even if the source line voltage Vsig is the minimum value of the gradation, the external light beam made incident on the display panel PNL may be slightly scattered and the visibility of the background of the display panel PNL may be lowered.

For this reason, the visibility of the background of the display panel PNL can be improved by applying the transparent drive of making the voltage between the pixel electrode 11 and the common electrode 21 smaller than the lower limit of gradation to the sequence of image display.

A relationship between the common voltage Vcom and the output of the source driver SD will be described here.

When a withstand voltage of the source driver SD is low, the common voltage Vcom is inversely driven to increase the liquid crystal applied voltage. At this time, the source driver SD can simultaneously output only one of the positive-polarity source line voltage Vsig (for example, reference voltage Vsig-c to 16V) and the negative-polarity source line voltage Vsig (for example, 0V to reference voltage Vsig-c). In addition, the polarity of the common voltage Vcom is opposite to the polarity of the output of the source driver SD.

However, when the source driver SD of a high withstand voltage is used, the relationship between the source line voltage Vsig and the common voltage Vcom may be the same as the above-described relationship but may also be a relationship to be described below. In other words, the common voltage Vcom is fixed to 0V, and the source line voltage Vsig output from the source driver SD is in a range between 0 and +16V at the positive polarity or a range between −16 and 0V at the negative polarity.

Figure 9:
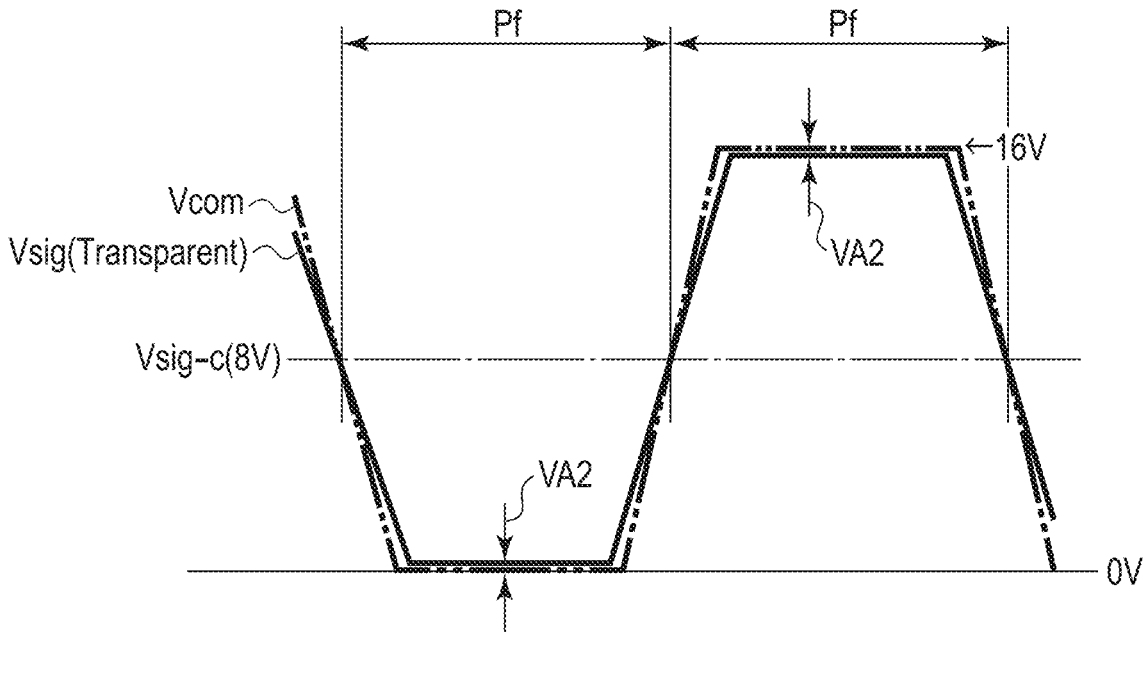
FIG. 9 is a chart showing an example of a common voltage and a source line voltage in a transparent drive.

FIG. 9 is a chart showing an example of the common voltage Vcom and the source line voltage Vsig in the transparent drive. The waveform of the source line voltage Vsig is represented by a solid line, and the waveform of the common voltage Vcom is represented by a two-dot chain line.

As shown in FIG. 9, the common voltage Vcom is switched alternately to 0V and 16V in each frame period Pf, similarly to the example shown in FIG. 8. In the transparent drive, the voltage value of the source line voltage Vsig matches the common voltage Vcom (Vsig=Vcom=0V or Vsig=Vcom=16V) in each frame period Pf. In FIG. 9, in view of a relationship in illustration between the source line voltage Vsig and the common voltage Vcom, both of them are slightly shifted. For this reason, the voltage of 0V is applied to the liquid crystal layer 30. In other words, the second transparent voltage VA2 is applied to the liquid crystal layer 30.

However, the source line voltage Vsig in the transparent drive is not limited to the example shown in FIG. 9. For example, the source line voltage Vsig may be higher than 0V and less than 8V (0V<Vsig<8V) in a period when the common voltage Vcom becomes 0V. The source line voltage Vsig may be higher than 8V and less than 16V (8V<Vsig<16V) in a period when the common voltage Vcom becomes 16V. In either of the cases, according to the transparent drive, an absolute value of the difference between the source line voltage Vsig and the common voltage Vcom is less than 8V and the parallelism of the light transmitted through the liquid crystal layer 30 is increased. In other words, the second transparent voltage VA2 is not limited to 0V, but an absolute value of the second transparent voltage VA2 may be less than 8V.

Incidentally, in the transparent drive, the voltage to be applied to the liquid crystal layer 30 may be less than the lower limit (for example, 8V) of the gradation, and the source line voltage Vsig may not completely match the common voltage Vcom. As described above, the degree of scattering in a case where the degree of scattering of the light made incident on the liquid crystal layer 30 is the highest when the scattering voltage VB is applied to the liquid crystal layer 30 is assumed to be 100%. For example, the second transparent voltage VA2 is desirably a voltage having the degree of scattering lower than 10%.

Figure 10:
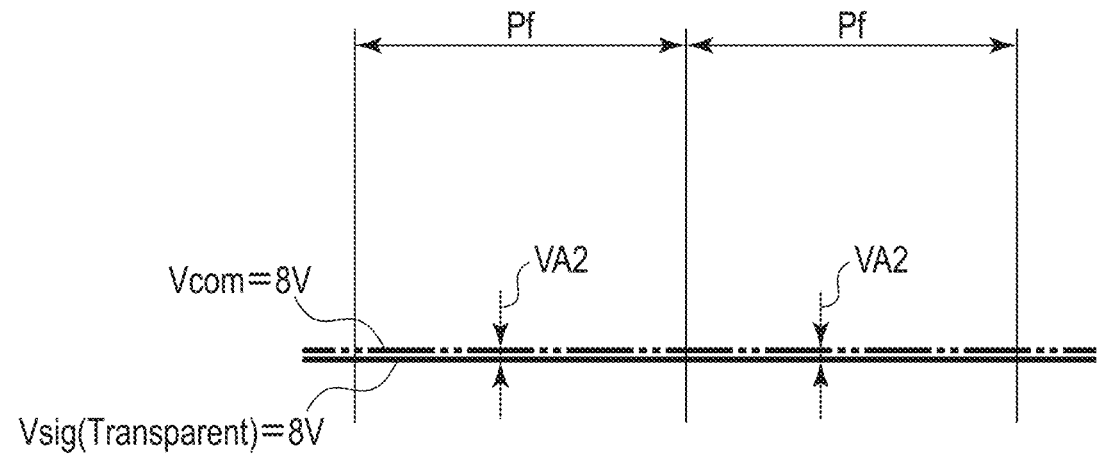
FIG. 10 is a chart showing another example of the common voltage and the source line voltage in the transparent drive.

FIG. 10 is a chart showing another example of the common voltage Vcom and the source line voltage Vsig in the transparent drive. The waveform of the source line voltage Vsig is represented by a solid line, and the waveform of the common voltage Vcom is represented by a two-dot chain line.

As shown in FIG. 10, in this example, the polarity inversion of the common voltage Vcom and the source line voltage Vsig is stopped in the transparent drive. Furthermore, the common voltage Vcom and the source line voltage Vsig match at 8V (above reference voltage Vsig-c). Incidentally, the common voltage Vcom and the source line voltage Vsig may match at a voltage other than the reference voltage Vsig-c, such as 0V. In addition, it is desirable that the second transparent voltage VA2 is a voltage with the degree of scattering in a range lower than 10%, similarly to the case shown in FIG. 9.

The one-line inversion drive scheme has been described above as the example of the transparent drive, but similar transparent drive can be applied to a line-inversion drive scheme of two or more lines and a frame inversion drive scheme.

Next, a configuration example of the timing controller TC will be described. A drive scheme in which one frame period includes a plurality of sub-frame (field) periods will be applied to the display device DSP. Such a drive scheme is referred to as, for example, field sequential system. Red, green, and blue images are displayed in the respective sub-frame periods. The images of the colors displayed in time division are mixed and visually recognized as multi-color display image for the user.

Figure 11:
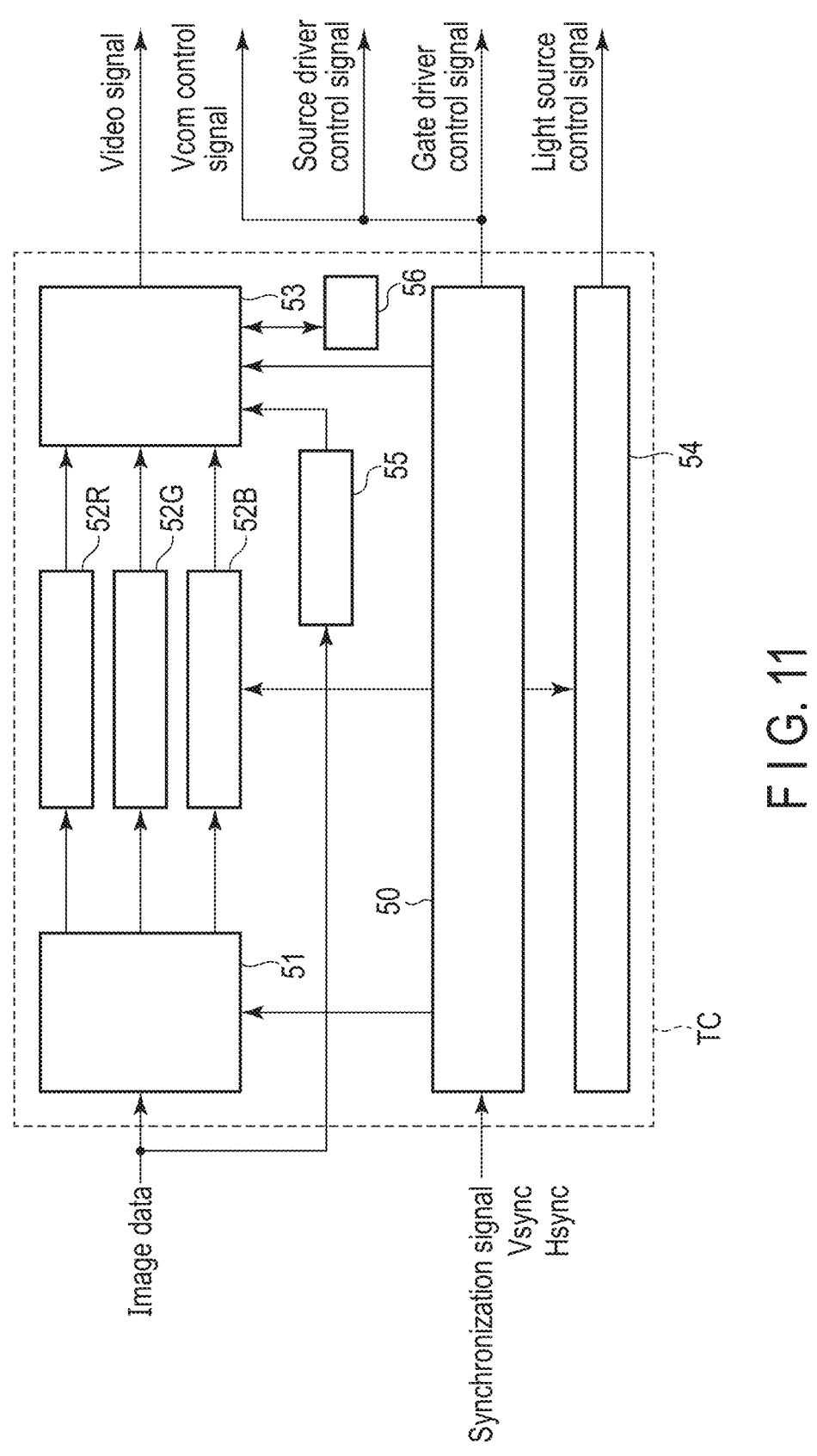
FIG. 11 is a diagram showing a configuration example of a timing controller shown in FIG. 3.

FIG. 11 is a diagram showing a configuration example of the timing controller TC shown in FIG. 3.

As shown in FIG. 11, the timing controller TC comprises a timing generation unit 50, a frame memory 51, line memories 52R, 52G, and 52B, a data conversion unit 53, a light source control unit 54, a detection unit 55 serving as an address detection unit, and the like.

The frame memory 51 stores image data for one frame input from the outside. The line memories 52R, 52G, and 52B store sub-frame data of red, green, and blue colors, respectively. The sub-frame data represent red, green, and blue images (for example, gradation values of the pixels PX) which the pixels PX are urged to display in time division. The sub-frame data of each of the colors stored in the line memories 52R, 52G, and 52B corresponds to a previous frame of the image data stored in the frame memory 51.

The data conversion unit 53 processes the sub-frame data of the colors stored in the line memories 52R, 52G, and 52B by various types of data conversion processing such as gamma correction, generates a video signal, and outputs the video signal to the above-described source driver SD. Incidentally, the timing controller TC may be configured to send RGB data to the data conversion unit 53 by allocating the RGB data in the frame memory 51. In this case, the timing controller TC can also be constituted without the line memories 52R, 52G, and 52B.

The light source control unit 54 outputs the light source control signal to the above-described light source driver LSD. The light source driver LSD drives the light emitting elements LSR, LSG, and LSB in accordance with the light source control signal. The light emitting elements LSR, LSG, and LSB can be driven under, for example, pulse width modulation (PWM) control. In other words, the light source driver LSD can adjust the luminance of each of the light emitting elements LSR, LSG, and LSB with the duty ratios of the signals output to the light emitting elements LSR, LSG, and LSB.

The timing generation unit 50 controls the operation timing of the frame memory 51, the line memories 52R, 52G, and 52B, the data conversion unit 53, and the light source control unit 54, in synchronization with a vertical synchronization signal Vsync and a horizontal synchronization signal Hsync that are input from the outside. In addition, the timing generation unit 50 controls the source driver SD by outputting a source driver control signal, controls the gate driver GD by outputting a gate driver control signal, and outputs a Vcom control signal.

The detection unit 55 is configured, when image data for one frame input from the outside includes data of an image, to detect an address of the data of the image. Examples of the image include a character displayed in a part of the display area DA. Examples of the character include a symbol including a letter, a figure, an icon, and the like. In addition, a case where data of the character is included in the image data means a case where data other than 0 is included in at least one piece of all bits of digital data. Address information of the data of the image is supplied to the data conversion unit 53. For this reason, when the image data input from the outside includes the data of the image, the timing controller TC can generate the processed video signal and output the processed video signal to the source driver SD in order to adjust the degree of scattering (transparency) of an area other than the area where the image is displayed. Generation of the processed video signal can be executed by calculation of the data conversion unit 53 or can be executed by using data stored in a table 56 of the timing controller TC.

Next, a process of adhering the display panel PNL to the cover panel CO1 in the method of manufacturing the display device DSP of the present embodiment will be described. FIG. 12 is an exploded perspective view showing the display panel PNL and the cover panel CO1 of the display device DSP, illustrating a state in which the display panel PNL is to be adhered to the cover panel CO1.

As shown in FIG. 12, the cover panel CO1 is prepared. The transparent substrate ME1 of the cover panel CO1 is curved. The transparent substrate ME1 is curved such that the main face Sa2 side is convex. However, the transparent substrate ME1 may be curved such the main face Sa1 side is convex.

The transparent substrate ME1 further has a side face Sb3 and a side face Sb4. Each of the side faces Sb1 and Sb2 extends straight. More specifically, the long side of the side face Sb1, which is an edge SI1, and the long side of the side face Sb2, which is the edge SI2, are straight. In contrast, each of the side face Sb3 and Sb4 extends to be curved. More specifically, the long side of the side face Sb3, which is the edge SI3, and the long side of the side face Sb4, which is the edge SI4, are curved. Based on the above, the side face Sb1 opposed to the light emitting element LS is a non-curved surface. The cross-section of the transparent substrate ME1 on the Y-Z plane is not curved, but the cross-section of the transparent substrate ME1 on the X-Z plane is curved.

Then, the display panel PNL is adhered to the cover panel CO1. At this time, the adhesive sheet AD1 is adhered to one of the display panel PNL and the cover panel CO1. In this example, the adhesive sheet AD1 is adhered to the display panel PNL. After that, the display panel PNL and the cover panel CO1 are opposed to each other. The display panel PNL is not curved before the display panel PNL is adhered to the cover panel CO1. After that, the display panel PNL is pressed against the cover panel CO1, and the display panel PNL is adhered to the cover panel CO1. The display panel PNL is thereby curved according to the cover panel CO1.

FIG. 13 is a cross-sectional view showing the display device DSP of the present embodiment. FIG. 13 shows only the first basement 10 and the second basement 20 of the display panel PNL.

As shown in FIG. 13, the cover panel CO1 (transparent substrate ME1), the adhesive sheet AD1, and the display panel PNL are curved such that the main face Sa2 side is convex, in the cross-section of the display device DSP on a virtual plane parallel to the Y-Z plane.

The light emitting element LS is composed of, for example, a light emitting diode. However, the light emitting element LS may be a laser or a laser diode. In such a case, it is desirable to provide a lens between the light emitting element LS and the side faces Sb1 and Sc1, spread the light emitted from the light emitting element LS in the X-Y plane direction, and make the light incident on the side faces Sb1 and Sc1.

The light emitting element LS can emit light onto the side face Sb1 of the transparent substrate ME1 having the thickness Ta. Since the size of the light emitting element LS opposed to the side face Sb1 can be increased, the luminance level of the light emitted from the light emitting element LS can be increased in proportion to the above-described size. Therefore, the user can visually recognize the display image of the display device DSP desirably.

In the present embodiment, the side faces Sb1 and Sc1 are located on the same plane. In addition, the light emitting element LS is opposed to not only the side face Sb1 of the transparent substrate ME1 but also the side face Sc1 of the second basement 20. The size of the light emitting element LS can be further increased, and the luminance level of the light emitted from the light emitting element LS can be further increased. Therefore, the user can visually recognize the display image of the display device DSP further desirably.

FIG. 14 is a developed perspective view showing the transparent substrate ME1 of the first embodiment.

As shown in FIG. 14, the transparent substrate ME1 has a rectangular plate shape. The transparent substrate ME1 has edges SI1, SI2, SI3, SI4, SI5, SI6, SI7, SI8, SI9, SI10, SI11, and SI12. The transparent substrate ME1 has vertices V1, V2, V3, V4, V5, V6, V7, and V8. Based on the above, the transparent substrate ME has six faces, twelve edges, and eight vertices.

The main face Sa1 and the side face Sb1 are in contact with each other at the edge SI5. The main face Sa1 and the side face Sb2 are in contact with each other at the edge SI6. The main face Sa1 and the side face Sb3 are in contact with each other at the edge SI7. The main face Sa1 and the side face Sb4 are in contact with each other at the edge SI8.

The main face Sa2 and the side face Sb1 are in contact with each other at the edge SI1. The main face Sa2 and the side face Sb2 are in contact with each other at the edge SI2. The main face Sa2 and the side face Sb3 are in contact with each other at the edge SI3. The main face Sa2 and the side face Sb4 are in contact with each other at the edge SI4.

The side face Sb1 and the side face Sb3 are in contact with each other at the edge SI9. The side face Sb1 and the side face Sb4 are in contact with each other at the edge SI10. The side face Sb2 and the side face Sb3 are in contact with each other at the edge SI11. The side face Sb2 and the side face Sb4 are in contact with each other at the edge SI12.

The vertex V1 is in contact with the edges SI1, SI3, and SI9. The vertex V2 is in contact with the edges SI5, SI7, and SI9. The vertex V3 is in contact with the edges SI1, SI4, and SI10. The vertex V4 is in contact with the edges SI5, SI8, and SI10. The vertex V5 is in contact with the edges SI2, SI3, and SI11. The vertex V6 is in contact with the edges SI6, SI7, and SI11. The vertex V7 is in contact with the edges SI2, SI4, and SI12. The vertex V8 is in contact with the edges SI6, SI8, and SI12.

In the present embodiment, a plurality of faces, a plurality of sides, and a plurality of vertices of the transparent substrate ME1 function as follows.

main face Sa1 . . . first main face,
main face Sa2 . . . second main face,
side face Sb1 . . . first incident face,
side face Sb2 . . . non-incident face,
side face Sb3 . . . first non-incident face,
side face Sb4 . . . second non-incident face,
edge SI5 . . . first edge,
edge SI7 . . . second edge,
edge SI6 . . . third edge,
edge SI8 . . . fourth edge, edge SI9 . . . fifth edge, edge SI1 . . . sixth edge, edge SI3 . . . seventh edge, vertex V2 . . . first vertex, vertex V1 . . . second vertex.

Each of the edges SI5 and SI6, among the plurality of edges that are in contact with the main face Sa1, is a long edge, and the edges SI7 and SI8 are edges that are shorter than the edges SI5 and SI6, respectively. Each of the edges SI1 and SI2, among the plurality of edges that are in contact with the main face Sa2, is a long side, and the edges SI3 and SI4 are edges that are shorter than the edges SI1 and SI2, respectively. Each of the edges SI1 and SI5, among the plurality of edges that are in contact with the side face Sb1, is a long edge, and the edges SI9 and SI10 are edges that are shorter than the edges SI1 and SI5, respectively. Each of the edges SI3 and SI7, among the plurality of edges that are in contact with the side face Sb3, is a long edge, and the edges SI9 and SI11 are edges that are shorter than the edges SI3 and SI7, respectively.

FIG. 15 is a cross-sectional view showing the transparent substrate ME1 in FIG. 14 along XV-XV line. In the drawing, the dashed line shows a contour of the transparent substrate ME1 to be chamfered.

As shown in FIG. 15, the shape of the side face Sb1 and the shape of the side face Sb2 are different from each other. The side face Sb1 is the face obtained by drawing a scribe line on the glass substrate and breaking the glass substrate. The side face Sb1 is a fracture surface. The side face Sb1 is a flat surface. The side face Sb1 is not polished.

Since the light emitting device LS applies light to the side face Sb1, the transparent substrate ME1 can desirably propagate light on the inner side. For example, since the light made incident on the main face Sa2 satisfies the condition of total reflection, it becomes difficult for the light made incident on the transparent substrate ME1 to leak outward from the main face Sa2.

A corner portion C5 located on the edge SI5 and a corner portion C1 located on the edge SI1, of the transparent substrate ME1, are not chamfered. For this reason, it is further difficult for the light made incident on the transparent substrate ME1 to leak outward from the main face Sa2. In the present embodiment, the corner portion C5 functions as a first corner portion and the corner portion C1 functions as a sixth corner portion.

Incidentally, all the side faces of the second basement 20, such as the side face Sc1, are fracture surfaces and are not the polished faces (FIG. 2). In addition, the second basement 20 is not chamfered (FIG. 2).

However, if the corner portions C1 and C5 of the transparent substrate ME1 are chamfered or the side face Sb1 is polished, the transparent substrate ME1 can hardly propagate light desirably on the inner side. For example, since the light made incident on the main face Sa2 includes components of the light made incident on the second main face Sa2 at an angle close to 90 degrees, the light made incident on the transparent substrate ME1 can easily leak outward from the main face Sa2.

To obtain the side face Sb2, scribe lines are first drawn on the glass substrate and the glass substrate is broken. Then, the side face Sb2 is polished. Since unevenness is formed on the side face Sb2, the side face Sb2 is not flatter than the side face Sb1. In other words, the surface roughness on the side face Sb2 is larger than that on the side face Sb1. By polishing the side face Sb2, for example, the size of the transparent substrate ME1 in the second direction Y can be adjusted.

A corner portion C6 located on the edge SI6 and a corner portion C2 located on the edge SI2, of the transparent substrate ME1, are chamfered. In the present embodiment, the surface of the corner portion C6 is a sloped surface, which is sloped from each of the main face Sa1 and the side face Sb2. The corner portion C6 serves as a third corner portion. The surface of the corner portion C2 is a sloped surface, which is sloped from each of the main face Sa2 and the side face Sb2. Incidentally, the corner portion C5 and the corner portion C1 are sharper than the corner portion C6 and the corner portion C2, respectively.

The corner portions C6 and C2 of the transparent substrate ME1 are chamfered. For this reason, the occurrence of chipping caused by handling during the manufacture of the transparent substrate ME1 or assembling into a module using the transparent substrate ME1 can be suppressed or prevented.

FIG. 16 is a cross-sectional view showing the transparent substrate ME1 in FIG. 14 along XVI-XVI line. In the drawing, the dashed line shows a contour of the transparent substrate ME1 to be chamfered.

As shown in FIG. 16, each of the shape of the side face Sb3 and the shape of the side face Sb4 is different from that of the side face Sb1.

To obtain the side face Sb3, the scribe lines are first drawn on the glass substrate and the glass substrate is broken. Then, the side face Sb3 is polished. The surface roughness on the side face Sb3 is larger than that on the side face Sb1.

To obtain the side face Sb4, scribe lines are first drawn on the glass substrate and the glass substrate is broken. Then, the side face Sb4 is polished. The surface roughness on the side face Sb4 is larger than that on the side face Sb1. By polishing the side face Sb3 and the side face Sb4, for example, the size of the transparent substrate ME1 in the first direction X can be adjusted.

A corner portion C7 located on the edge SI7, a corner portion C3 located on the edge SI3, a corner portion C8 located on the edge SI8, and a corner portion C4 located on the edge SI4, of the transparent substrate ME1, are chamfered. The corner portion C7 functions as a second corner portion, the corner portion C8 functions as a fourth corner portion, and the corner portion C3 functions as a seventh corner portion.

In the present embodiment, the surface of the corner portion C7 is a sloped surface, which is sloped from each of the main face Sa1 and the side face Sb3. The surface of the corner portion C3 is a sloped surface, which is sloped from each of the main face Sa2 and the side face Sb3. The surface of the corner portion C8 is a sloped surface, which is sloped from each of the main face Sa1 and the side face Sb4. The surface of the corner portion C4 is a sloped surface, which is sloped from each of the main face Sa2 and the side face Sb4.

Incidentally, each of the corner portions C5 and C1 is sharper than the corner portions C7, C3, C8, and C4 (FIG. 15).

The corner portion C7, the corner portion C3, the corner portion C8, and the corner portion C4 of the transparent substrate ME1 are chamfered. For this reason, the occurrence of chipping caused by handling during the manufacture of the transparent substrate ME1 or assembling into a module using the transparent substrate ME1 can be suppressed or prevented.

FIG. 17 is a cross-sectional view showing the transparent substrate ME1 in FIG. 14 along XVII-XVII line.

As shown in FIG. 17, a corner portion C9 located at the edge SI9, a corner portion C10 located at the edge SI10, a corner portion C11 located at the edge SI11, and a corner portion C12 located at the edge SI12 of the transparent substrate ME1 are not chamfered. The corner portion C9 serves as a fifth corner portion.

Each of the corner portions C9, C10, C11, and C12 is sharper than the corner portions C6 and C2 (FIG. 15). The corner portions C9 and C10 on both sides of the side face Sb1 are not chamfered. Light can desirably propagate inside the transparent substrate ME1 as compared to a case where the corner portions C9 and C10 are chamfered.

FIG. 18 is a cross-sectional view showing the transparent substrate ME1 in FIG. 14 along XVIII-XVIII line. In the drawing, the dashed line shows a contour of the transparent substrate ME1 to be chamfered.

As shown in FIG. 18, the transparent substrate ME1 has a top portion P2 located at the vertex V2, a top portion P1 located at the vertex V1, a top portion P8 located at the vertex V8, and a top portion P3 located at the vertex V3. The vertex V2 serves as a first vertex and the vertex V1 serves as a second vertex. In addition, the top portion P2 functions as a first top portion and the top portion P1 functions as a second top portion.

Each of the top portions P2, P1, P8, and P3 is chamfered. Although not shown in the drawing, the top portions located at the vertex V6, the vertex V5, the vertex V4, and the vertex V3, respectively, are also chamfered.

FIG. 19 is an enlarged perspective view showing a part of the transparent substrate ME1 in FIG. 14. The top portion P2 will be described as a representative of the plurality of top portions of the transparent substrate ME1.

As shown in FIG. 19, a surface of the top portion P2 is a sloped surface, which is sloped from each of the main face Sa1, the side face Sb1, and the side face Sb3. The surface of the top portion P2 is also sloped from the surface of the corner portion C7. For this reason, the occurrence of the above chipping can be further suppressed or prevented.

According to the display device DSP of the first embodiment configured as described above, the display device DSP comprises the display panel PNL, the first transparent substrate ME1, the first adhesive sheet AD1, and the first light source unit LU1. When the side face Sb1 is polished or the corner portions C1 and C5 are chamfered, the transparent substrate ME1 can hardly propagate light desirably on the inner side.

If it is difficult for light to desirably propagate inside the transparent substrate ME1, the amount of light may be insufficient, and it is difficult for the user to visually recognize images (characters) displayed on the display device DSP. In addition, the brightness of the images displayed by the display device DSP may cause different situations on the side face Sb1 side and the side face Sb2 side.

Therefore, the shape of the side face Sb1 is different from that of the side face Sb3. The side face Sb1 is a fracture surface. It is difficult for light made incident on the transparent substrate ME1 to leak outward from the main face Sa2.

In addition, the corner portions C1 and C5 are not chamfered. For this reason, it becomes further difficult for the light made incident on the transparent substrate ME1 to leak outward from the main face Sa2.

The user can easily visually recognize the images (characters) displayed on the display device DSP. Therefore, the display device DSP capable of increasing the display quality can be obtained.

In addition, occurrence of chipping can be suppressed or prevented in the process of manufacturing the display device DSP. Therefore, a display device DSP with a high manufacturing yield can be obtained. In addition to the above, various suitable advantages can be obtained from the present embodiment.

Modified Example of First Embodiment

Next, modified example of the first embodiment will be described. The display device DSP is configured in the same manner as the display device DSP of the above-described first embodiment except for the configuration described in the modified example. FIG. 20 is a cross-sectional view showing the transparent substrate ME1 of the modified example. In the drawing, the dashed line shows a contour of the transparent substrate ME1 to be chamfered.

As shown in FIG. 20, chamfering the corners of the transparent substrate ME1 is not limited to C chamfering, but may be R chamfering. The surface of the corner portion C6 is a curved surface which protrudes outward from the transparent substrate ME1. The surface of the corner portion C2 is a curved surface which protrudes outside of the transparent substrate ME1.

In the modified example as well, the same advantages as the above-described first embodiment can also be obtained.

Second Embodiment

Next, a second embodiment will be described. The display device DSP is configured in the same manner as the display device DSP of the above-described first embodiment except for the configuration described in the second embodiment. Incidentally, in the second embodiment, the display device DSP is not curved. FIG. 21 is a cross-sectional view showing the display device DSP of the second embodiment. FIG. 22 is a plan plan view showing a cover panel CO1, first light source units LU1, and second light source units LU2 of the second embodiment.

As shown in FIG. 21 and FIG. 22, the display device DSP comprises the second light source units LU2. The first light source units LU1 and the second light source units LU2 can emit light to a transparent substrate ME1 and a second basement 20 from both sides. The second basement 20 has a side face Sc2 located on a side opposite to a side face Sc1. Light emitting elements LS of the second light source unit LU2 are located on the side face Sc2 (side face Sb2) side with respect to a display area DA in the second direction Y, and can emit light toward the display area DA. The light emitting element LS of the second light source unit LU2 has a light emitting portion (light emitting surface) EM which is opposed to the side face Sb2 and which emits light to the side face Sb2.

The illumination light emitted from the light emitting portion EM of the second light source unit LU2 is made incident on the side face Sb2 and propagates through a transparent substrate ME1 (cover panel CO1), an adhesive sheet AD1, and a display panel PNL. In the second embodiment, the light emitting portion EM of the second light source unit LU2 is also opposed to the side face Sc2 of the second basement 20 and further emits light to the side face Sc2.

In the second embodiment, the side face Sb2 functions as a second light incident surface. A side face Sb3 is located between the side face Sb1 and the side face Sb2. A side face Sb4 is located between the side face Sb1 and the side face Sb2.

FIG. 23 is a cross-sectional view showing the transparent substrate ME1 of the second embodiment.

As shown in FIG. 23, FIG. 16, and FIG. 22, the shape of the side face Sb2 and the shapes of the side faces Sb3 and Sb4 are different from each other. The side face Sb2 is the face obtained by drawing a scribe line on the glass substrate and breaking the glass substrate. The side face Sb2 is a fracture surface. The side face Sb2 is a flat surface. The side face Sb2 is not polished. The surface roughness on the side faces Sb3 and Sb4 is larger than that on the side face Sb2.

Since the light emitting element LS of the second light source unit LU2 applies light to the side face Sb2, the transparent substrate ME1 can desirably propagate light on the inner side. For example, since the light made incident on the main face Sa2 satisfies the condition of total reflection, it becomes difficult for the light made incident on the transparent substrate ME1 to leak outward from the main face Sa2.

The corner portions C6 and C2 of the transparent substrate ME1 are not chamfered. The corner portions C6 and C2 are sharper than the corner portions C7, C3, C8, and C4. For this reason, it is further difficult for the light made incident on the transparent substrate ME1 to leak outward from the main face Sa2.

The same advantages as those of the above-described first embodiment can also be obtained from the second embodiment. Furthermore, light can be applied to both sides of the transparent substrate ME1 using the first light source unit LU1 and the second light source unit LU2. Therefore, the reduction in the luminance level of the display device DSP can be suppressed.

Modified Example 1 of Second Embodiment

Next, modified example 1 of the second embodiment will be described. The display device DSP is configured in the same manner as the display device DSP of the second embodiment except for the configuration described in modified example 1. FIG. 24 is a cross-sectional view showing the transparent substrate ME1 of modified example 1.

As shown in FIG. 24, the side face Sb3 and the side face Sb4, which are non-incident surfaces of transparent substrate ME1, are polished. The transparent substrate ME1 may not be chamfered. For example, the corner portion C7, the corner portion C3, the corner portion C8, and the corner portion C4 of the transparent substrate ME1 are not chamfered. Each of the corner portions C7, C3, C8, and C4 is sharp similarly to the corner portions C5 and C1 (FIG. 23).

The same advantages as those of the above-described second embodiment can also be obtained from modified example 1.

Modified Example 2 of Second Embodiment

Next, modified example 2 of the second embodiment will be described. The display device DSP is configured in the same manner as the display device DSP of the second embodiment except for the configuration described in modified example 2. FIG. 25 is a cross-sectional view showing the transparent substrate ME1 of modified example 2.

As shown in FIG. 25, the side face Sb3 and the side face Sb4, which are non-incident surfaces of the transparent substrate ME1, may not be polished. The transparent substrate ME1 is chamfered. For example, the corner portion C7, the corner portion C3, the corner portion C8, and the corner portion C4 of the transparent substrate ME1 are chamfered. Each of the corner portions C5 and C1 is sharper than the corner portions C7, C3, C8, and C4 (FIG. 23).

The same advantages as those of the above-described second embodiment can also be obtained from modified example 2.

Third Embodiment

Next, a third embodiment will be described. The display device DSP is configured in the same manner as the display device DSP of the first embodiment except for the configuration described in the third embodiment. Incidentally, in the second embodiment, the display device DSP is not curved. FIG. 26 is a cross-sectional view showing the display device DSP of the third embodiment. FIG. 27 is a plan view showing a cover panel CO1, a first light source unit LU1, and an optical member 70 of the display device DSP of the third embodiment. FIG. 28 is a perspective view showing a part of the optical member 70 of the third embodiment.

As shown in FIG. 26 and FIG. 27, the display device DSP further comprises the optical member 70. The optical member 70 extends in the first direction X and is located between the side face Sb1 of the transparent substrate ME1 and the first light source unit LU1 (light emitting elements LS). The light emitting elements LS emit light toward the optical member 70. The optical member 70 has a function of focusing the light made incident from the first light source unit LU1 and transmitting the light to the side face Sb1 side. The optical member 70 can increase the components of the light traveling in a direction parallel to the second direction Y and transmit the light to the side face Sb1, in the Y-Z plane. The optical member 70 can also limit the light in the thickness direction (third direction Z). For example, it is difficult for light made incident on the transparent substrate ME1 to leak outward from the main face Sa2. Therefore, the light can desirably propagate to the side face Sb2 side inside the transparent substrate ME1.

In the present embodiment, the optical member 70 is also located between the side face Sc1 of the second basement 20 and the first light source unit LU1 (light emitting elements LS). The optical member 70 can also focus the light made incident from the first light source unit LU1 and transmit the light to the side face Sc1 side.

As shown in FIG. 28, the optical member 70 is a microlens array including a plurality of arrayed microlenses 71 and a plate-shaped transparent layer 72. The plurality of microlenses 71 and the transparent layer 72 are formed integrally. Each of the microlenses 71 is raised so as to be convex on the side face Sb1 side or the side face Sc1 side. In plan view in which the optical member 70 is viewed from the side face Sb1 side, the shape of the microlens 71 is a quadrangular shape. In plan view, however, the shape of the microlens 71 may be a polygon other than a quadrangular shape, such as a hexagon, or may be a circle.

In the display device DSP of the third embodiment configured as described above, as well, the same advantages as those of the first embodiment can be obtained, and the display device DSP capable of improving the display quality can be obtained. The components of the light made incident perpendicularly on the side faces Sb1 and Sc1 can be increased by providing the optical member 70. The light emitted by the light emitting elements LS can be efficiently input (transmitted) to the inside of the transparent substrate ME1 and the inside of the second basement 20. Therefore, the user can visually recognize the display images of the display device DSP further desirably. Alternatively, the power consumption of the first light source unit LU1 can be reduced. Incidentally, the optical member 70 may be a lenticular lens.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the first, second, and third colors are not limited to red, blue, and green colors, respectively. In addition, the light source unit LU may comprise light emitting elements LS of two or less colors or may comprise light emitting elements LS of four or more colors. Alternatively, the light source unit LU may comprise a light emitting element LS of white color. The number of line memories, the number of pieces of the sub-frame data, and the number of sub-frame periods may be increased or reduced in accordance with the number of types (number of colors) of the light emitting elements LS.

A normal mode polymer dispersed liquid crystal may be used as the liquid crystal layer 30. The liquid crystal layer 30 maintains parallelism of the incident light when the applied voltage is high or scatters the incident light when the applied voltage is low.

Each of the first basement 10 and the second basement 20 of the display panel PNL may be formed of resin. In this case, each of the first basement 10 and the second basement 20 is desirably formed of an amorphous resin. One of examples of the amorphous resin is a cyclo-olefin polymer (COP). By forming the first basement 10 and the second basement 20 of amorphous resin, scattering of light inside each of the first basement 10 and the second basement 20 can be suppressed and the light can be guided desirably.

Incidentally, each of the first basement 10 and the second basement 20 may be formed of a crystalline resin. One of examples of a crystalline resin is polyethylene terephthalate (PET).

What is claimed is:
1. A display device comprising:
a display panel having a display area where an image is displayed and external light is transmitted;
a transparent substrate overlapping with the display area, and having a first main face which has a first edge and a second edge, a first incident face which is a first side face in contact with the first main face at the first edge, and a first non-incident face which is a second side face in contact with the first main face at the second edge;
a fixing member located between the transparent substrate and the display panel and fixing the display panel to the transparent substrate; and
a first light source unit which is opposed to the first incident face of the transparent substrate and is configured to apply light to the first incident face,
wherein
the transparent substrate further has a first corner portion located at the first edge and a second corner portion located at the second edge,
the second corner portion has a chamfered shape,
the first corner portion is sharper than the second corner portion, the transparent substrate further has a fifth corner portion located at the fifth edge with which the first incident face and the first non-incident face are in contact, and
the fifth corner portion is sharper than the second corner portion.
2. The display device of claim 1, wherein
a surface of the second corner portion is a curved surface which protrudes outside the transparent substrate or a sloped surface which is sloped from each of the first main face and the first non-incident face.
3. The display device of claim 1, further comprising:
a second light source unit,
wherein
the transparent substrate further has a second incident face which is a third side face in contact with the first main face at the third edge and which is located on a side opposite to the first incident face,
the first non-incident face is located between the first incident face and the second incident face,
the second light source unit is opposed to the second incident face of the transparent substrate to apply light to the second incident face,
the transparent substrate further has a third corner portion located at the third edge, and
the third corner portion is sharper than the second corner portion.
4. The display device of claim 3, wherein
the transparent substrate further has a second non-incident face which is a fourth side face in contact with the first main face at the fourth edge and which is located on a side opposite to the first non-incident face, and a fourth corner portion located at the fourth edge,
the fourth corner portion has a chamfered shape, and
the third corner portion is sharper than the fourth corner portion.
5. The display device of claim 1, wherein
the transparent substrate further has a first top portion located at a first vertex with which the first edge, the second edge, and the fifth edge are in contact, and
the first top portion has a chamfered shape.
6. The display device of claim 1, wherein
the transparent substrate further has a second main face which is in contact with the first incident face at the sixth edge and is in contact with the first non-incident face at the seventh edge and which is located on a side opposite to the first main face, a sixth corner portion located at the sixth edge, and a seventh corner portion located at the seventh edge,
the seventh corner portion has a chamfered shape, and
the sixth corner portion is sharper than the seventh corner portion.
7. The display device of claim 6, wherein
the transparent substrate further has a second top portion located at a second vertex with which the fifth edge, the sixth edge, and the seventh edge are in contact, and
the second top portion has a chamfered shape.
8. The display device of claim 1, wherein
a shape of the first incident face and a shape of the first non-incident face are different from each other.
9. The display device of claim 8, wherein
the first incident face is a fracture surface.
10. The display device of claim 8, wherein
surface roughness on the first non-incident face is larger than surface roughness on the first incident face.

* * * * *